(12) United States Patent
Elberbaum

(10) Patent No.: US 8,269,376 B1
(45) Date of Patent: Sep. 18, 2012

(54) METHOD AND APPARATUS FOR SWITCHING ON-OFF A GROUP OR ALL LIGHTS OR APPLIANCES OF PREMISES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 13/225,993

(22) Filed: Sep. 6, 2011

(51) Int. Cl.
H01H 31/10 (2006.01)
(52) U.S. Cl. ........................................................ 307/115
(58) Field of Classification Search .................... 307/115
See application file for complete search history.

(56) References Cited

U.S. PATENT DOCUMENTS

| | | |
|---|---|---|
| 5,923,363 A | 7/1999 | Elberbaum |
| 6,603,842 B2 | 8/2003 | Elberbaum |
| 6,940,957 B2 | 9/2005 | Elberbaum |
| 7,290,702 B2 | 11/2007 | Elberbaum |
| 7,461,012 B2 | 12/2008 | Elberbaum |
| 7,639,907 B2 | 12/2009 | Elberbaum |
| 7,649,727 B2 | 1/2010 | Elberbaum |
| 7,864,500 B2 | 1/2011 | Elberbaum |
| 7,973,647 B2 | 7/2011 | Elberbaum |
| 8,041,221 B2 | 10/2011 | Elberbaum |
| 2010/0278537 A1 | 11/2010 | Elberbaum |
| 2011/0227510 A1 | 9/2011 | Elberbaum |

OTHER PUBLICATIONS

U.S. Appl. No. 12/963,876, filed Dec. 9, 2010 (cited in the specification). Specification and Drawings Attached.
U.S. Appl. No. 13/086,610, filed Apr. 14, 2011 (cited in the specification). Specification and Drawings Attached.

*Primary Examiner* — Robert L. DeBeradinis
(74) *Attorney, Agent, or Firm* — Katten Muchin Rosenman LLP

(57) ABSTRACT

A method and apparatus for switching AC appliances and lights of residences and other automation systems through SPDT or DPDT relays connected in electrical circuit with SPDT or DPDT switch including a current sensor and/or a status sensor. The operating key of the relay and the key lever of the electric switch can each be used for operating a dedicated appliance or light, a group of appliance and lights and all appliance and/or lights including scenarios setup via the many well known two way, three way or four way light switches, by operating the switch lever or key in multi steps. The SPDT or DPDT relays are operated via RF, IR and fiber optic communicating two way signal for operating the lights and reporting statuses.

60 Claims, 7 Drawing Sheets

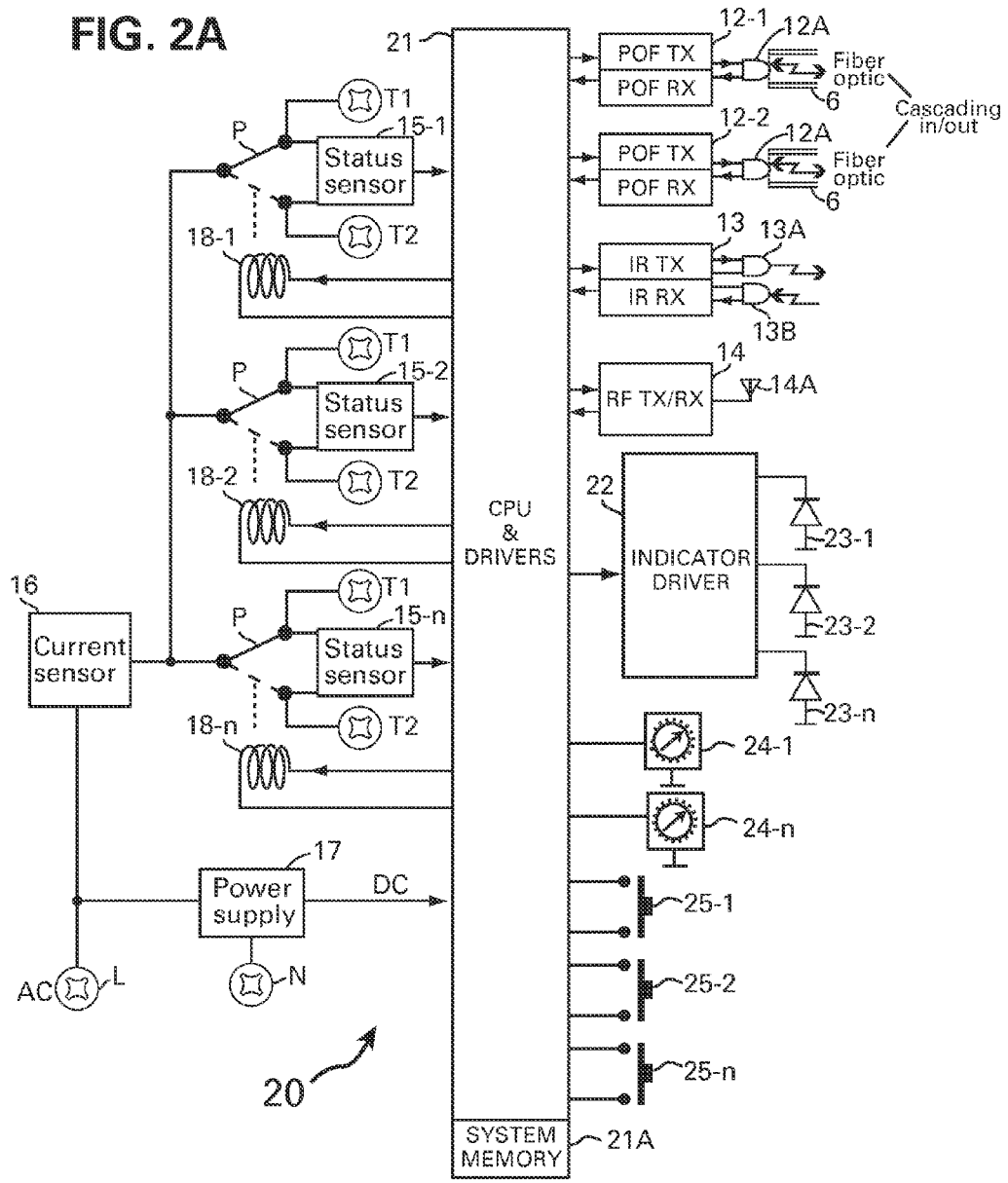
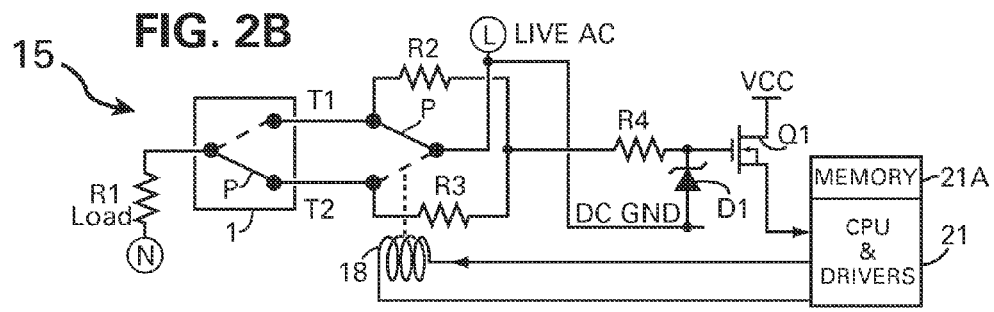

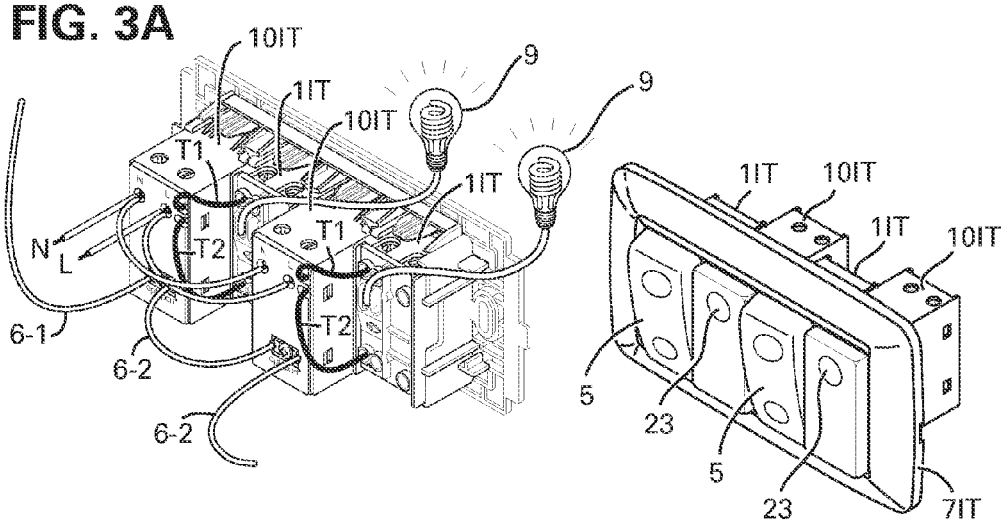
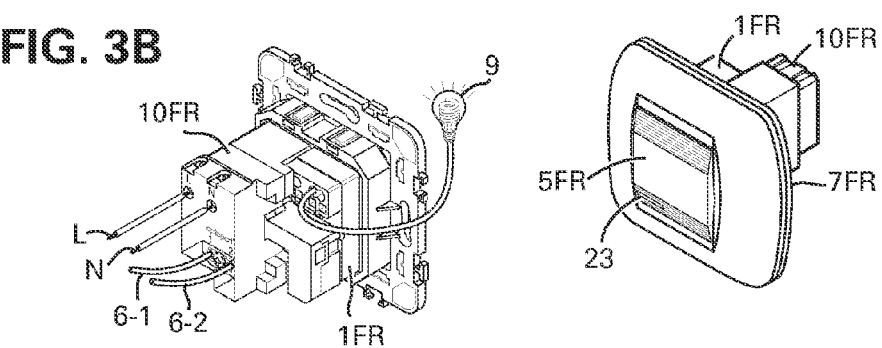
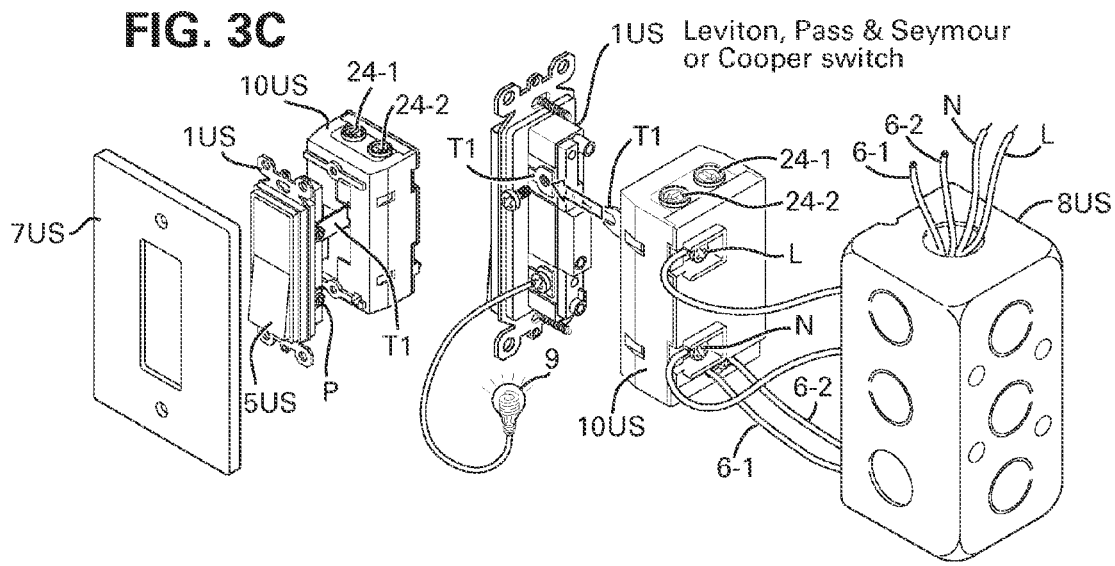

METHOD AND APPARATUS FOR SWITCHING ON-OFF A GROUP OR ALL LIGHTS OR APPLIANCES OF PREMISES

BACKGROUND OF THE INVENTION

1. Field of the Invention

This invention is related to remotely operating SPDT AC power semiconductor switches or relays used in home automation operated via wireless remote control or plastic optical fiber and lightguide cables in combination with mechanical SPDT power switches, including current and status sensors.

2. Description of the Prior Art

Remotely operating AC power relays switch on and off electrical appliances such as home heaters, air conditioners, motorized curtains, lighting and other electrical appliances in homes, apartments, offices and buildings. However, verifying the operation status of a remotely operated appliance is complex. Literally all electrical appliances do not report their status and the person operating the remote control device has to verify the on or off status of the operated device by being at the site of the operated appliance for verifying if the lights are on or off, or the aircondition unit is activated or not.

Most of the remote control devices including IR or RF wireless remote control units use the same power key (and code) to switch the appliance on and off, therefore without the operating person's self verification on site, with most of currently available remotely controlled systems it is impossible to positively verify the on-off power status from a remote site. Such prevailing prior art makes it impossible to command without error a group of lights or all lights or a group of appliances or all appliances to switch on or off via a single key, command or process.

One prevailing prior art of home automation uses the relays statuses to update the system controller by tapping the relay's driver circuits status or the last command sent to each of the relays. Such prior art systems mandates the re-design of the whole electrical wiring structure and the customizing of the AC electrical wiring structure for each residence individually. Such undertaking requires expertise to configure, install and maintain, all of which are expensive.

The appliance status reporting on the basis of the relay status does not reliably provide real time current drain statuses, for example, a boiler's relay status will remain on even though no current is drained when the boiler's power is cut by the boiler thermostat. Moreover, the prevailing prior art applies only to fixedly wired electrical lights and appliances. It cannot apply to appliances that are operated by wireless remote control and are randomly connected to AC outlets.

Further, the known AC wiring regulations and building codes forbid the connections, mixing and mingling of AC power wires with low voltage signal wires inside the same electrical box and/or the connecting, the mixing or the mingling of AC power wires with low voltage control wires within the same conduit and/or the same relay in the same wall box and/or with other electrical power devices inside a wall box. Such strict electrical and building codes narrowed the controls of home automation devices to basic three communication signals including wireless (IR and RF) and modulated RF via the AC power lines. This mandates the replacement of AC wiring switches with a whole network of low voltage wiring and the replacement of the switches with key pads, touch screens and other low voltage control devices.

Another significance with remote controlling of home automation systems of current days is the ability to switch electrical appliances on and off remotely via PCs through the Internet, via mobile telephones, iPad and/or via other PDA devices. The problem however for such remote controlling is the need for a verified on-off status of the appliances being operated and/or the availability of a status report covering all the remotely controlled appliances and lights of a given room, house, office, apartment or a building. The power consumption reporting including specific itemized consumption of each individual rooms, house, apartment, office and businesses provide the needed data for remote controlling of the appliances and light without error.

Devices for detecting the on-off status or a standby status and current drain is disclosed in U.S. Pat. Nos. 7,649,727 and 7,864,500, IR devices for communicating such on-off or standby statuses via two way RF or IR remote control system along with IR remote control devices for operating AC power switches and AC operated appliances are disclosed in U.S. Pat. No. 7,639,907 and such devices operated through lightguide or fiber optic cable are disclosed in U.S. patent application Ser. Nos. 12/236,656, 12/725,808, 12/761,484, 12/963,876 and 13/086,610 with the content of the referenced US patents and the applications are incorporated herein by reference.

Similarly, such method and apparatuses for integrating remote control devices with video interphone systems and shopping terminals are also disclosed in U.S. Pat. Nos. 7,290, 702 and 7,973,647.

For all the disclosed and known power switching and control devices, there is a need to access the devices i.e., establishing the connectivity for feeding control signals and retrieving a switch status and/or the current consumption via the switch or via power outlets. But the electrical safety codes and regulations that forbid connections of a low voltage communication line to an AC power switch and AC power outlets held back the needed power consumption reporting until now. To provide reliable on-off and the propagation of operating command and to receive in return a status report and/or to enable a non restricted connectivity between a low voltage control devices and an AC power switches and outlets, the use of the optical fiber and lightguide was introduced in the above referenced US patents and applications.

Further, the remotely controlled SPDT relay disclosed in U.S. Pat. Nos. 7,649,727 and 7,864,500 and in the referenced applications provide for combining automation relays and current sensors in electrical box adjacent to the mechanical SPDT switch, attached or joint to the SPDT switch itself within the same electrical box. The user's preference is to switch the lights or group of lights by a single key lever of a switch they got accustom to operate, and moreover it is not architecturally pleasing to add different keys for automation and/or additional keys for switching groups of lights or all lights. Similarly the users do not welcome the idea they have to walk all the way to a wall mounted touch screen controller to switch on-off different lights or all lights, while providing touch screen in every room or zone of the residence is a price prohibitive and complex to integrate. The need to use a single or plural old style key levers of a common AC electrical wiring switch for operating a given light, group of lights or all the lights is needed for residences and other premises automation. The reference to "old style" key levers should not be read literally as "old". The key lever of the "old style" should be read as including attractively and modern designed and styled key levers and wall covers for the AC electrical wiring switches.

SUMMARY OF THE INVENTION

It is an object of the present invention to provide a method and apparatus for transforming any of the manual SPDT power switch connected to, attached to or join with a mechanical or a semiconductor AC power SPDT relay, including a current and/or a status sensor, into a combination switch for switching on-off the individual light or lights or appliance that are directly connected to the manual switch, as well as a group of lights or all the lights of the premises.

The AC current sensors are disclosed in the above referenced U.S. Pat. Nos. 7,649,727 and 7,864,500. Relays and current sensors operating via lightguide or fiber optic cable are disclosed in U.S. patent application Ser. Nos. 12/236,656, 12/725,808, 12/761,484, 12/963,876 and 13/086,610 all incorporated herein by reference.

Another object of the present invention is to provide multi SPDT relays with multi keys assembly for connection to plurality of SPDT manual switches for switching on-off plurality of lights and "all" the light through a dedicated controller, and/or video interphones and/or "shopping terminals" and/or via a communication network including the generating and propagating control codes and signals from the dedicated controller, the video interphones and the shopping terminals to the different appliances through an IR driver circuits as described in the above referenced U.S. Pat. Nos. 7,290,702 and 7,973,647, and through any of the connected SPDT manual switches. "Shopping terminals" are disclosed in U.S. Pat. No. 7,461,012 and video interphones systems are disclosed in U.S. Pat. Nos. 5,923,363, 6,603,842 and 6,940,957 and are also incorporated herein by reference.

In the following description and the claims the term "live AC" refers to the "hot line" of the AC power or mains, as oppose to the neutral line of the AC power or mains.

In the following description and the claims the term "load" refers to an appliance such as light fixture or other electrical appliance that is connected between the neutral line and the live AC line via an on-off switch and/or via a current sensor.

In the following description and the claims the term "key" refers to a push, press, depress, touch, click, slide, toggle, flip, lever, sea-saw and other structures for operating electrical switch and/or low current signal switch, the term "keying" refers to operating the listed switch structures. The term "rekeying" refers to repeat keying of the same key.

In the following description and the claims the term "lightguide" is a term used by Toray Industries Ltd. of Japan for marketing its Plastic Optical Fiber known as POF, having large core diameter for propagating more light. POF or lightguide attenuation is lowest at 650 nm, or the red region of the visual light. When used in the following descriptions and in the claims the term lightguide covers plastic optical fiber and any other fiber optic cable having a core of 250 microns or larger diameter, known also as multi mode or step index fiber optic cable.

In the following description and the claims the term "optical transmitter" refers to an LED, laser or other optical emitting devices that transform electric signals into IR or visual light signals or both.

In the following description and the claims the term "transmitting IR" or "IR signal" refers to IR signal emission from an optical transmitter, in air such as from hand held remote control or from an IR repeater.

In the following description and the claims the term "optical signal" refers to electromagnetic radiated signals within the UV spectrum, visual spectrum and the IR spectrum propagated via lightguide and/or fiber optic cable.

In the following description and the claims the term "optical receiver" refers to photo diode, Pin diode, photo transistor or other photo detectors for receiving IR or visual light signals and converting them into electrical signals. Optical receiver also refers to photovoltaic cells that transform visual light or IR into electric charge.

In the following description and the claims the term "receiving IR" or "IR signal" refers to the receiving of IR in air in line of sight, such as from an hand held IR remote control, or via IR repeater.

In the following description and the claims the term "optical transceiver" refers to a combined optical transmitter and optical receiver accessed through a combined access of a semiconductor package with direct optical links to a single fiber optic or lightguide cable for propagating bidirectional or two way optical signal, or via an access attached to or comprising an optical prism or other optical structure such as half mirror, lens or a filter for propagating two way optical signals through a single lightguide or fiber optic cable by deflecting, directing or filtering a received optical signal to the receiver and allowing the transmitted optical signal to pass into the optical medium cable. The term optical transceiver also applies to separate transmitter and receiver for propagating bidirectional or two way optical signals via dual cores contained in one lightguide or optical fiber cable and/or via two optical lightguides or fiber optic cables each with a single core and/or to propagating two way or bidirectional IR signal in air.

In the following description and the claims the term "optoport" refers to the optical access for attaching a single lightguide for bidirectional and unidirectional optical communications, the term "optoports" may be referred to a two or more optical accesses, each for bidirectional or unidirectional optical communication via lightguides. Two optoports may be used for bidirectional communication via two lightguides. Optoport may include prism and other optical structures referred to above.

In the following description and the claims the term "wireless transceiver" covers all type of RF transceiver and IR transceiver for propagating and receiving IR signals in air, including IR transceiver combining IR TX and IR RX as separate devices.

In the following description and the claims the term "transceiver" covers all type of transceivers including RF transceiver, IR signal transceiver and optical transceiver.

In the following description and the claims the term "AC switching device" or "AC device" refers to a remotely controlled AC power devices, for operating AC appliances via semiconductor or mechanical contacts relay and remotely operated mechanical relay for operating for example AC powered motors or water boilers, and further include current sensors and AC outlets and combinations thereof. The terms "relay" and "relays" hereafter and in the claims cover electromechanical relays and semi-conductor relays such as thyristors, triacs and FETs. the term AC device is characterized by being powered by AC power and/or is connected in series with an appliance, such as light fixture, directly or non directly to a live AC line and remotely operated by IR, RF and/or via optical signals comprising visual light and/or IR signals through lightguides or fiber optic cables.

Even though only IR or visual light may be recited in the descriptions and the claims, the term "IR" and the "visual light" propagated via lightguide or fiber optic cable refers to both unless specifically so restricted. The term IR or visual light is used alternately and should not be restrictive to propagating signals via the lightguide to the one or the other.

In the following description and the claims the term "wireless" refers to any and all signals propagated in air including IR and RF.

In the following description and the claims the term "low voltage device" and/or "low voltage control device" and/or "command converter" refers to a control device powered by low AC or DC voltage such as 12V DC for communicating via RF or IR in air, or optical signals via lightguide, with the AC devices and include one or plurality of IR, RF and/or optical transceivers with attachment facilities for attaching and securing the one or more lightguides for communicating one way or two way or bidirectional.

In the following description and the claims the term "current sensor receiver" refers to a low voltage device for receiving optical signal via lightguide or wireless signal in air pertaining a current drain data from an AC powered current sensor device, detecting the AC current drained through an AC power wire by induction or by magnetic hall sensor or other current sensing methods, such as disclosed in the above referenced US patents and applications for communicating the current drain or status to the system controller.

The remote controlled and/or manually operated AC switching devices for introduction into an electrical box remotely from, adjacent to, or joined with a manual SPDT switch and other objects of the present invention are attained by connecting or attaching an AC switching device including a semiconductor SPDT switch or an SPDT relay controlled via a lightguide or fiber optic cable, and/or by wireless including IR or RF or both, to a manual AC SPDT switch, by connecting or attaching the AC device to the manual AC switch via traveler wires or pigtails and control the combined or joined SPDT relay and manual SPDT switch by operating the key lever of the manual switch, or the key of the AC switching device and by communicating one or two way optical signals via the lightguide or fiber optic cable, or in air via IR or RF, including commands to operate the AC switching device, and receive in return a confirmation such as the AC current drain from the AC device or statuses of the connected lights or electrical appliances, such as on-off status signals from the appliances directly or via the AC device.

The status can be generated in response to a received command to operate, or in response to an inquiry command (a request for status data) including a reply on the basis of the current drain as measured by the sensor, thereby providing error free remote controlling of the electrical home appliances and lights and error free real time current consumption data for enabling an error free on-off commands to a group or all lights.

The present invention, similar to the referenced pending US applications and patents, uses a combination of an add-on wireless and/or lightguide operated AC relays that include mechanical or semiconductor SPDT relays and current sensors, packaged or encapsulated with a single or a plurality of transceivers and accesses for a single lightguide or a plurality of lightguides, such as used for in-out cascading lightguides to a serially connect plurality of AC devices in a cascaded chain.

The packaged enclosure is designed and structured to be connected, attached or physically joined, with a selected popular manually activated SPDT or DPDT switch, for installation into standard single or multiple gang or other individual standard size electrical box or into adjacent or distant boxes. The AC devices hidden behind the manual switch can be structured without operating key, while the AC devices installed next to or remote from the manual switch can include a key for operating a light or an appliance and include a program for enabling the same key or the manual switch key to operate a group of appliances or lights including all appliances and/or lights.

The detailed circuits and block diagrams of the SPDT relays including the IR or RF receiver and transmitter or transceivers and of the AC current sensor and of the circuits for the lightguide or fiber optic cable including the propagating of one or two way IR, RF or visual light communication signals between the AC relays and the low voltage IR or RF propagating devices, including lightguide converter disclosed in the referenced US patents and applications applies to the preferred embodiment of the present invention with the exception of combining multi AC switches or relays into a single multi relays device, as will be explained later.

Because, the lightguide and/or the fiber optic cable are fire retardant and perfect insulators, they can be mingled and mixed with AC wires in conduits and be attached to the AC switching device or the AC current sensor inside the same electrical box. By this arrangement it is possible to power the control circuit of the AC switching device by the AC power and propagate RF or IR communication signal in air or visual light signal via the lightguide to operate the AC switching device and the AC current sensor.

The method of combining packaged AC relay devices including current sensor or status sensor to an existing standard electrical switches, introduces several major advantages; one is the lowering of the overall cost of the switches, because standard low cost, mass produced switches can be used. The second advantage is that the manual actuating of the commonly used manual switches is all that it takes to operate the switch (the way the electrical light switches are operated presently) with the addition the present invention provides, which is the ability to actuate the same key lever of the same manual switch for switching on-off a dedicated light, a group of lights or appliances and all the light or appliances.

The added advantages including the operating of the switches remotely, in parallel by wireless remote control units, keypads, dedicated controller, video interphone monitor and via the Internet or mobile phones or iPad and by the present invention are the other objects of present invention, attained in total harmony and with no conflict between the manual and remote switching operation as described in the referenced US patents and applications and below.

The pending US applications teach the use of two types of switches for AC appliances and light fixture, namely a single pole-double throw (SPDT) switches for on-off switching of a given appliance such as used to switch light fixture from two separate positions. In instances were three or more switches are needed to switch on-off the same light fixture, another type of dual pole-dual throw (DPDT) switches are used and are connected in a given straight-cross configuration in between the two SPDT switches described above. The DPDT switches and the DPDT relays are also known as "reversing" or 4 way switches or relays.

Accordingly, another objects of the present invention is to attach a lightguide to an AC SPDT relay device connected to one of an SPDT and DPDT light switch for operating a light fixture or other electrical appliance via one or several manual switches in cascade. Thereby maintaining the operation via a "commonly used" manual switch and provide the conveniences and efficiency of remote switching via the wireless or lightguide controlled SPDT relay connected to the one or several switches in a given configuration.

Yet another object of the present invention is to attach a wireless or lightguide operated DPDT relay for switching on-off light fixture or other electrical appliance in a system connected to two manual SPDT switch and to a more comprehensive switching setup that includes two SPDT and one or more DPDT switches.

The IR or RF receiver and transmitter of the AC switch device, including the AC current sensor through which the power is fed, for example, to a television receiver, transmits to the dedicated home automation controller, the video interphone or the shopping terminal, via the fiber optic or lightguide cable and through the disclosed IR or RF receiver or the IR or RF repeater, in return to a power-on command to the television receiver, a reply that the power is now on, thereby updating the home automation controller, or said video interphone or the shopping terminal with the television "on status", or "off status" if the command was to switch off the television.

The reference to home automation controller hereafter is to a panel device with control keys or touch screen and circuits similar to the video interphone and/or the shopping terminal disclosed in the US patents and applications.

BRIEF DESCRIPTION OF THE DRAWINGS

The foregoing and other objects and features of the present invention will become apparent from the following description of the preferred embodiments of the invention with reference to the accompanying drawings, in which:

FIG. 2A is an electrical block diagram of the SPDT AC switching device including dual accesses for cascading lightguides including multi relays and keys of the preferred embodiment, for connection to plurality of standard AC SPDT switches;

FIG. 2B is an electrical circuit diagram of the status sensor used for identifying the on-off status of a load.

FIGS. 3A, 3B and 3C are illustration of the SPDT AC switching device including dual accesses for cascading lightguides of the preferred embodiment, for installation and attachment side by side with, at the rear of and joint to an SPDT AC switch, such as manufactured by Gewiss of Italy, Legrand of France and Leviton, Pass & Seymour or Cooper of the US and into standard European or US electrical boxes;

DETAILED DESCRIPTION OF THE PREFERRED EMBODIMENTS

Figure 1A:
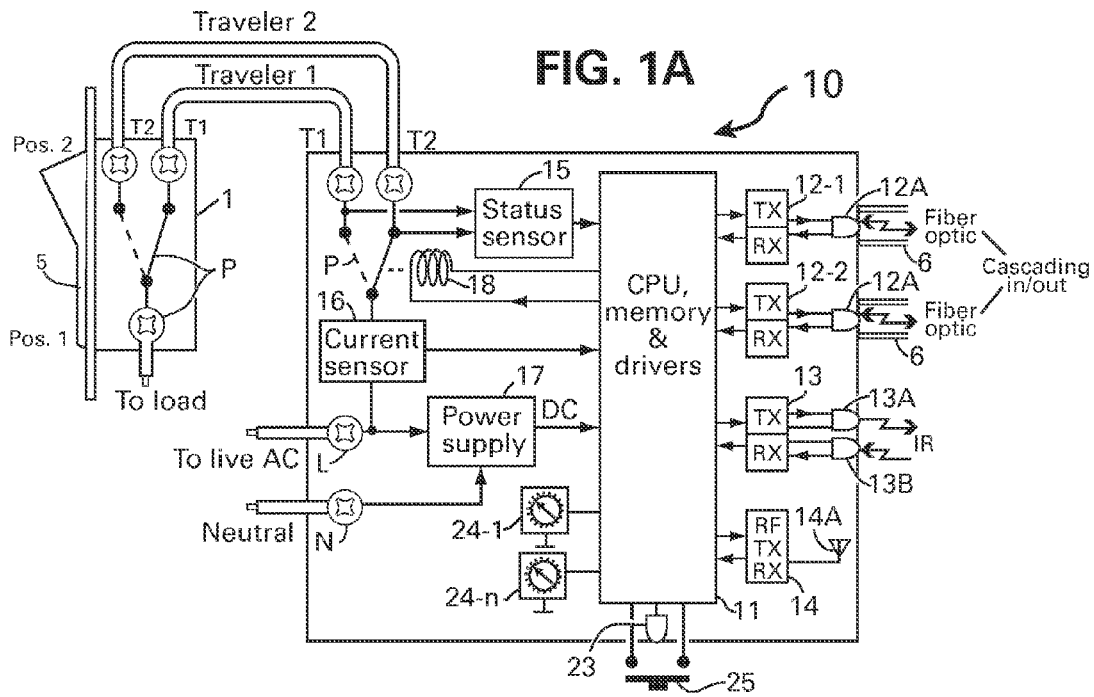
FIGS. 1A and 1B are electrical block diagrams of the SPDT and DPDT AC switching device including dual accesses for cascading lightguides of the preferred embodiment, for connection to standard AC SPDT switch or switches.
Figure 1B:
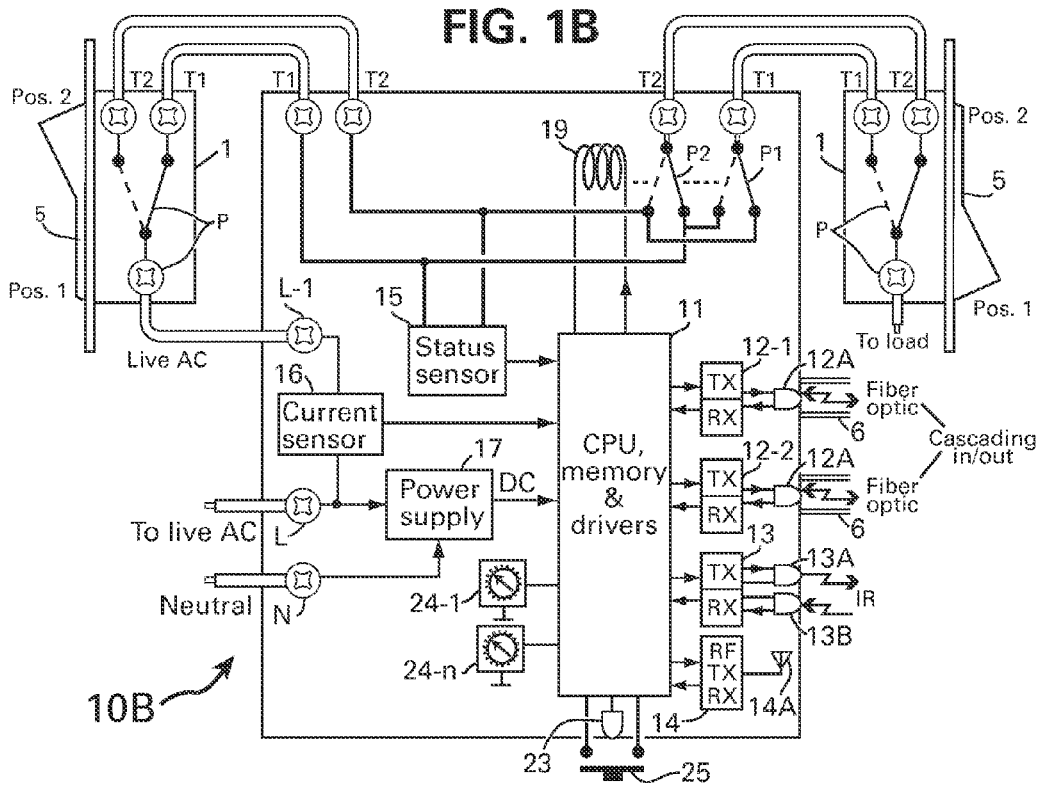

FIGS. 1A and 1B show block diagrams summarizing the on-off switching circuits for operating AC appliances such as light fixtures or heaters, manually through an SPDT switch 1 and remotely by the SPDT relay 18 of the AC switching devices 10 of FIG. 1A and the DPDT relay 19 of the switching device 10B shown in FIG. 1B. The known single pole-dual throw (SPDT) switch 1 includes a lever actuated pole contact P that enables to switch over the power from traveler terminal T1 to T2 for connecting AC power to an appliance or a load in combination with the remotely operated mechanical or semiconductor SPDT and DPDT relays of the AC devices 10 and 10B used for home, office and other premises automation and disclosed in the referenced US patent and applications. The SPDT or DPDT relay contacts, similar to the SPDT switch, connect or break the AC current fed to an AC appliance via the relay assembly 18 or 19 of AC switching devices 10 and 10B, representing hereafter each of the AC switching devices 10, 10FR, 10EU and 10IT shown in FIGS. 3A, 3B, 3C, 7B and 7C.

The combining of the SPDT switch and the SPDT or DPDT relay of FIGS. 1A and 1B via two traveler lines T1 or T2 for connecting the SPDT switch 1 with the SPDT relay 18 of the AC device 10 or the DPDT relay 19 of the AC device 10B, disclosed in the referenced US patents and applications is for providing two independent on-off switching of an AC appliance, remotely via any of the relays of the AC devices 10 or 10B and manually via the switch 1.

The switching circuits of FIG. 1B illustrates how it is possible to switch a given appliance on-off remotely via the DPDT relay 19 of the AC device 10B and via two manual SPDT on-off switches 1 and via n number of cascading DPDT switches, not shown here but are disclosed in the referenced US patents and applications, the content of which are incorporated herein by reference. The known Dual Pole-Dual Throw (DPDT) switches and relays, connected in a cascaded traveler chain, cross or connect the travelers in straight lines. As disclosed in the US patents and applications the switch over from straight to cross of each DPDT switch enables n number of DPDT switches to be connected in the cascading circuit for manually switching the electrical lights or appliance on-off, independently by any one of the DPDT switches in the line, and/or remotely via the disclosed DPDT or SPDT relays.

The remote switching of a cascaded traveler line however presents a reliability issue, wherein for error free remote switching of an appliance it is necessary to know the appliance operating status. It is necessary to know if the appliance power is on or off before commanding the relay to switch over. Without appliance status, the reversing of an SPDT or DPDT relay may switch the appliance power opposite of the intended command. For example, not knowing that a heater is switched off, commanding the heater relay to switch off may switch the heater on. It is possible to identify if a light fixture is lit or not on the basis, for example, of a commands fed to a driver circuit of a remotely operated SPST (Single Pole Single Throw) relay. But it is not possible to rely on a relay status when SPDT or DPDT relays are connected to an SPDT or DPDT manual switches, that are operated manually at random.

Further, for an SPDT relay control to become truly reliable it is necessary to feed a returned confirmation or data pertaining to the current drain or the on-off status of the light or the AC appliance, propagated from the light or the appliance to the controller. This mandate a two way or bidirectional communications, control commands to the AC power relays or the appliance itself and a returned confirmations, status or power current drain data from the appliances or the AC relay device to the controller. The need for feeding current drain or power consumption data to the power stations are the core topic and the main objectives for the home automation considerations and the debates around the world held presently on the subject of signal or data connectivity and the smart grid programs.

The pending US applications disclose bidirectional IR and RF communications (in air), and visual light communications via lightguide or fiber optic cable for remotely operating appliances including the receiving of a returned data. Even though wireless communications are perceived to be simple, they are not very reliable, for example, movements or placement of obstructing objects within a room may obstruct the line of sight of an IR remote on-off command to a given appliances, including a command from an IR remote control repeater disclosed in the referenced patents and applications. The appliance returned confirmation and/or the on or off command itself may become obstructed and unreliable.

RF may transmit and receive erroneously by invading to and from other residences and/or the RF signals do not necessarily cover the whole residences and commands or returned data are not communicated or do not reach their destinations as intended. RF network for covering many appliances and AC outlets of a residence require extensive, complex and accurate addressing that are far beyond the electrical installers training and knowhow.

The reliability issue relating to the unknown state of the SPDT switches 1 shown in FIGS. 1A and 1B making the on or off state of either the switch lever 5 and/or the relay's poles P and P1/P2 unclear. This is why the positions of the levers 5 shown in FIGS. 1A and 1B are not termed on or off, but as position 1 (Pos.1) and position 2 (Pos.2). The inability to have an accurate on-off state of either the SPDT or the DPDT switch and the relay 18 or 19 shown in FIGS. 1A and 1B presents a system reliability problem. The reason for this is the impossibility for the AC device 10 or 10B to identify the poles P of the switch or switches 5 and the poles P1/P2 of DPDT switches (not shown) Pos.1 or Pos.2 statuses.

The solutions for providing a reliable on-off status to a dedicated controller or to the video interphone or to the shopping terminal that control the AC devices, the electrical switches and the AC outlets of the home automation are disclosed in the referenced US patents and applications, namely the introduction of the current sensor 16. The current sensor 16, be it current sensor by induction, magnetic hall sensing circuit, or any of other known current sensing circuits and methods, identifies in real time the appliance status for propagating an optical signal containing data pertaining the status of the appliance via lightguides or IR in air and/or propagating RF signals.

This data includes the verifying of the current drain, and thus enabling the controller to positively switch on and off the light or the appliance. Moreover it provides the base for the residences, offices or other businesses or organizations to report their real time current drain or power consumption to the power station's smart grid.

The DC power for the relays 18 or 19, the CPU 11 or 21 and other internal circuits can use a residual rectified AC power by tapping on the residual voltage or current drain between live AC line and the load, using circuits disclosed in the referenced US patent and applications or any other known switching power supply circuits for the low DC current needed and/or the use of low DC voltage or current analog regulators.

As explained in the referenced US patents and applications the reason for not connecting the AC neutral line to the AC device is the intent to connect the AC switching device through the commonly employed AC power wiring as used for connecting AC switches. Since the currently installed wiring use only live AC and load lines, i.e., only two wires are commonly found in the conduits and in the wall boxes, the intent was to provide devices that operated with the commonly existing two wires for lighting and other appliances with no change. The DC powering circuits for such common wiring however are more complex, less efficient, require compromises and are costlier.

On the other hand, the existing rules, codes and regulations of all known electrical wiring permit unrestricted introduction of AC neutral line into the conduit and any of the AC electrical wall boxes, including the connections of such AC neutral line to any and all AC switching and other AC devices and circuits. Moreover, considering that the present invention calls for the physical introduction of lightguide and fiber optic cables to the AC device, the simultaneous introduction of the neutral AC line with the lightguide is the most cost effective answer to provide a small size AC device for attachment to a popular AC switch of the present invention. With the neutral line in the box it is simple to introduce a well known low current DC power supply, powered by the AC power line, using low power switching regulators ICs such as disclosed in the referenced US patents and applications and similar low consumption power supplies.

From the above description it becomes clear that the SPDT AC switching devices of the present invention can be installed into a standard electrical AC boxes, wired in compliance with the electrical codes and rules, without any significant changes to the basic wiring of the commonly installed electrical systems and be attached to SPDT or DPDT AC switches with non compromised efficiency, low cost and simplicity.

The reference patent application Ser. Nos. 12/725,808 and 12/963,876 teach a cascaded connections of lightguides or fiber optic cables to the AC switching and other AC devices and appliances such as light fixtures. The patent application Ser. No. 12/236,656 discloses the many other variations for attaching lightguide and fiber optic cable to optical accesses. The lightguide cables ends are terminated by a sharp guillotine cutter for attachment to the optical accesses, disclosed as one way or unidirectional and two way or bidirectional and combinations thereof.

From the above summary and explanation including the referenced US patents and applications it is clear that AC switching devices with or without current sensors can be controlled via a cascading chain of optical signals through the lightguides or fiber optic cables, and by IR adjusted to be in line of sight and/or by wireless RF signals.

From the teaching of the referenced US patents and applications it also become clear that the AC devices such as current sensors or AC switching devices or AC outlets can be set with address pertaining the particulars of the appliance including the room or zone of the premises, via setting selectors 24-1~24-n of FIGS. 1A, 1B, 2C, 3C, 4A and 4B and/or via downloading such particulars and address into a memory included in the AC device. This includes the downloading via RF signals, IR in air signals and directly via optical signal through the lightguide or the fiber optic cable and via hand held device into the one or more lightguide accesses, termed optoports, of the AC device.

The difference between the AC devices of the present invention and the disclosed AC devices in the referenced US patents and application is in the programs of the AC devices and the method to assign "double keying" to the keys of the AC devices or "double action" to the levers of the switches such as "on-off-on" or "off-on-off". The assignment is applicable to any of the AC devices installed behind the popular SPDT or DPDT switches, or side by side with the switches within the same wall box or connected by traveler wires and installed at distance from the switches, for switching on-off a group or all of the lights or appliances as explained further below.

Figure 4A:
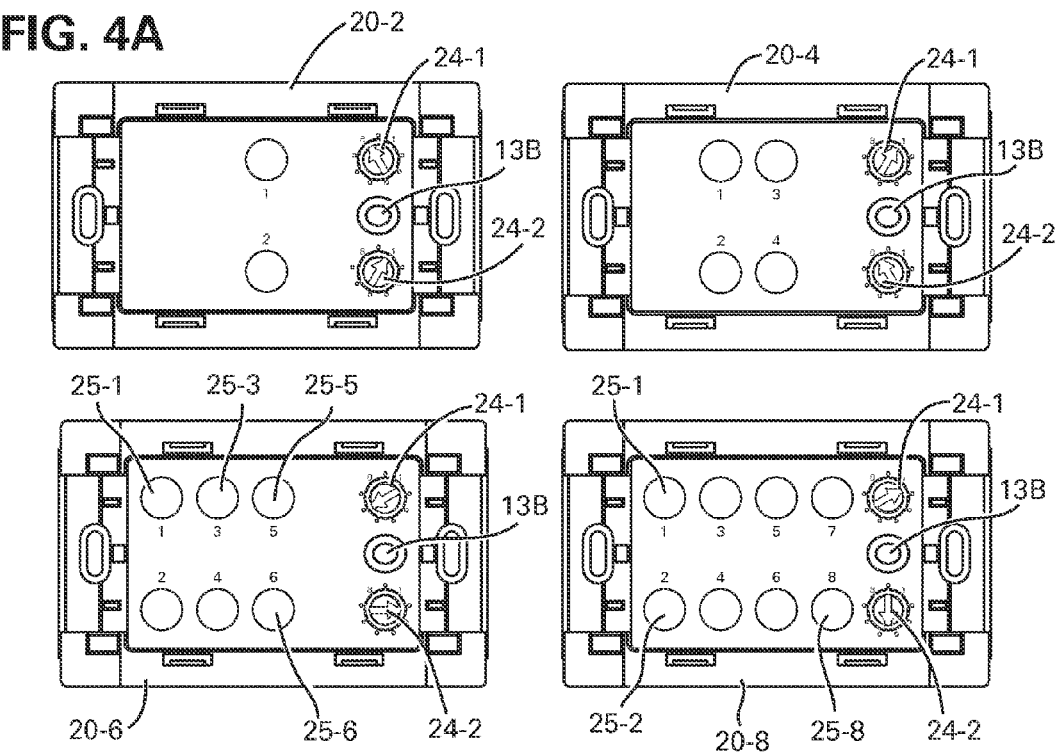
FIGS. 4A and 4B are illustrations of the SPDT different setups of multi relay AC switching devices of FIG. 2 of the preferred embodiment, for installation into standard single gang US and Italian or European electrical boxes.
Figure 4B:
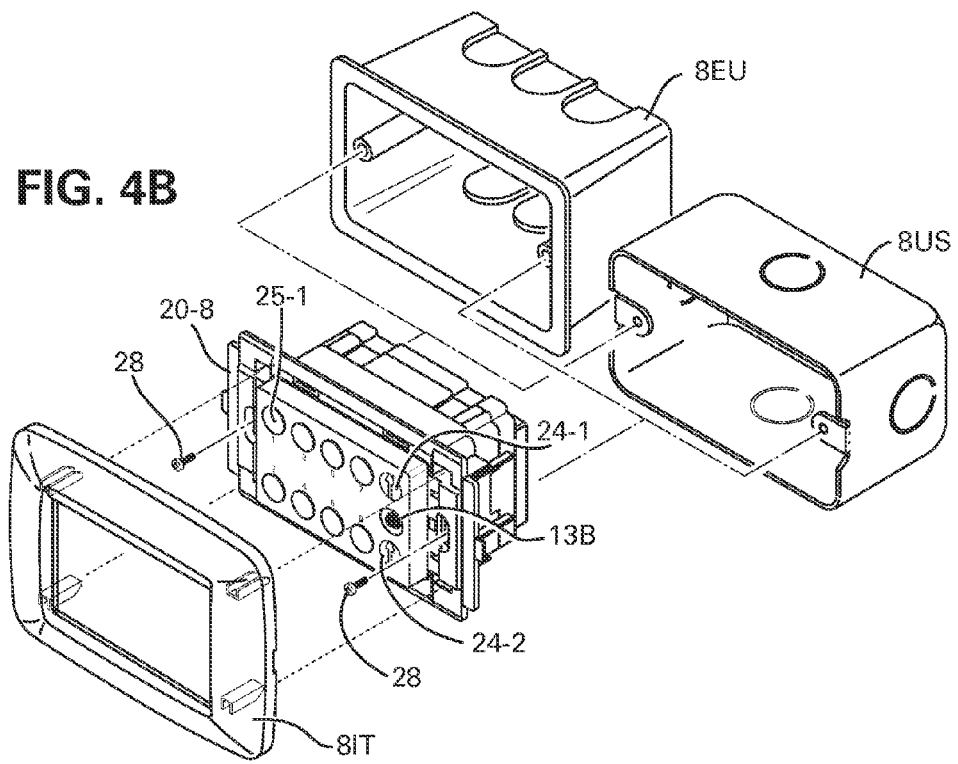
Figure 5:
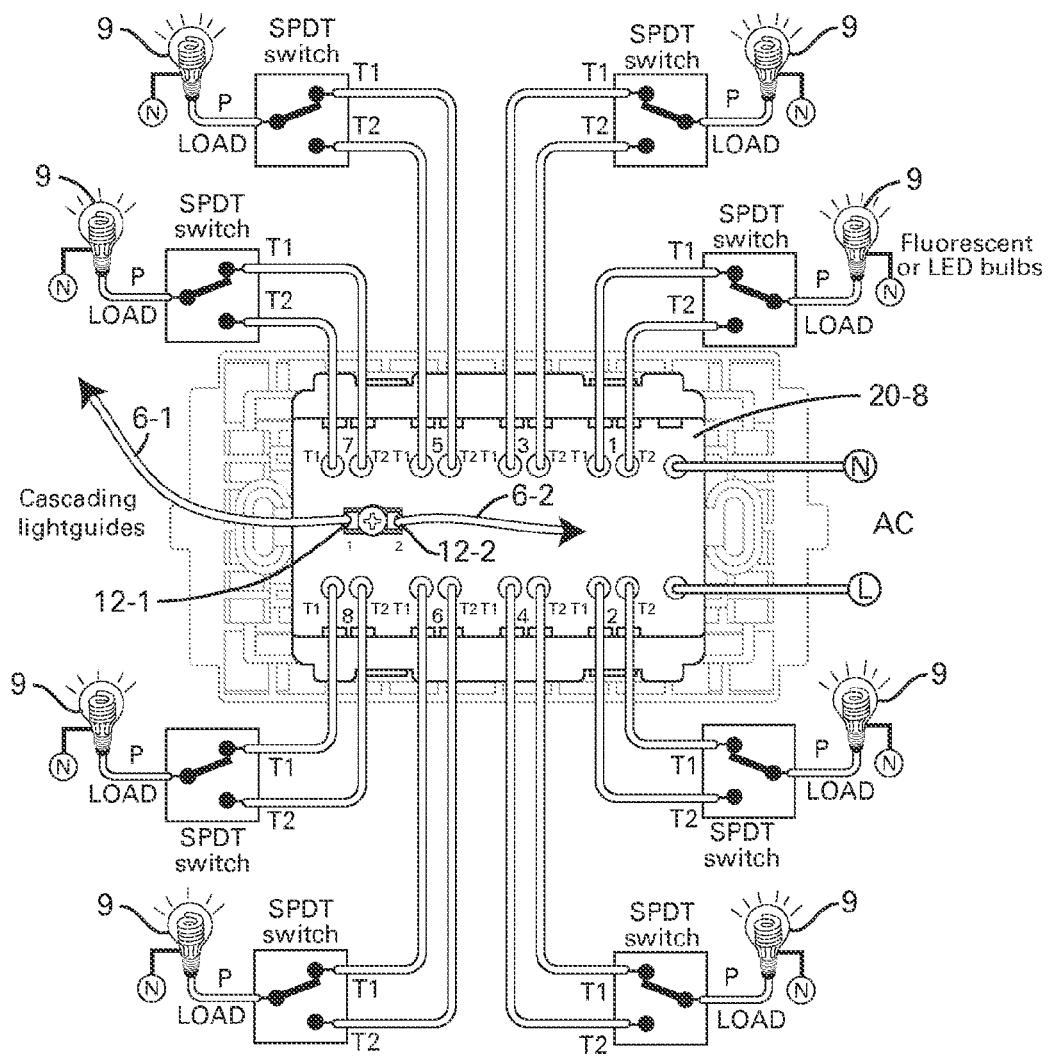
FIG. 5 is an illustrative connection diagram of the multi relays SPDT AC switching device of FIGS. 4A and 4B for connection through the travelers terminals at the rear of the multi relays AC SPDT device with SPDT light switches, including dual optoports for connecting the cascading lightguides of the preferred embodiment.

Another difference is the multi relays AC device 20 shown in FIG. 2, packaged into a single AC device for switching on-off 2, 4, 6, 8 or n lights or other appliances shown in FIGS. 4A, 4B and 5. The multi relay AC device 20 comprises circuits similar to circuits shown in FIG. 1A. The AC device 20 is characterized by the plurality of SPDT relays for connection to plurality of SPDT or DPDT switches. The relays 18-1, 18-2 and 18-$n$ shown in FIG. 2 are similar relays to the relay 18 of FIG. 1A, with each pair of the terminals T1 and T2 connect to an SPDT or DPDT switch. The CPU and drivers 21 of the AC device 20 is programmed to operate anyone of the relays 18-1~18-$n$ individually, a group of or all of the relays as commanded by the keys 25-1~25-$n$, be it off or on individually, or of a group or all of the relays. For an error free switching the CPU and driver 21 must be provided with the statuses of all the loads connected to the SPDT switch directly, or via a cascaded chain of DPDT switches (not shown).

The referenced patents and applications teach the use of current sensor for identifying the status of the load. The term load is used to replace the terms lights and appliances used above.

FIGS. 1A and 1B show two sensors, the current sensor 16 and the status sensor 15. The status sensor 15 shown is not needed for the AC devices 10 and 10B because the current sensor 16, connected in series with the load, through the contacts of the relays 18 or 19 and through the SPDT or DPDT switch or switches will positively identify the current drain through the load and therefore provide error free status.

The status sensor 15 in contrast to the current sensor 16 does not provide current drain values or data, it does provide however a status data by identifying the relay pole position versus the SPDT switch position and outputting a signal when the relay pole or the manual SPDT switch disconnect the live AC power from the load. In simple terms the status sensor outputs a signal when the load is connected to one of the T1 or T2 travelers terminal and the live AC is fed to the other traveler terminal.

FIG. 2B shows an electrical circuit or a block diagram of a conceptual circuit of the status sensor 15 of the preferred embodiment of the present invention, wherein the two shown sensing resistors R2 and R3 both having high ohm value are connected to the two traveler terminals T1 and T2 of the SPDT relay 18. R2 and R3 are connected together at their other end via a series resistor R4 to the FET Q1 gate and via a zener diode D1 to the ground. For clarification, the ground potential and the DC polarity fed by the power supply 17 for powering the CPU, the relays and the other circuits of the AC devices 10, 10B and 20 is connected to the live AC. The ground DC potential and the positive DC or VCC is for example +12V or +5V or +nV measured vs the AC live line.

The AC live line is connected directly to the pole terminals of all the shown relays 18 and 19 and therefore when the relay pole 18 is in contact with terminal T2, opposite the pole position shown in FIG. 2B, the sensor resistor R3 is at a DC ground potential and the FET Q1 gate signal is zero, keeping the FET Q1 in off state.

The pole of relay 18 shown in FIG. 2B is in contact with terminal T1 while the load R1 is in contact with terminal T2 of switch 1. Accordingly the load R1 that is fixedly connected to the neutral line N and is shown cut from direct contact with the live AC is serially connected to the live AC via the sensor resistors R2 and R3 instead. The resultant voltage divider R2 and R3 (the resistance of R1 load is negligible) provide a minute current through R4 and the zener D1 to ground and an adequate voltage potential to the FET gate to switch the FET Q1 on. The switched on FET output signal to the CPU 21 identifies a non connected load, or an "off" status data to the CPU and drivers 21.

Figure 6A:
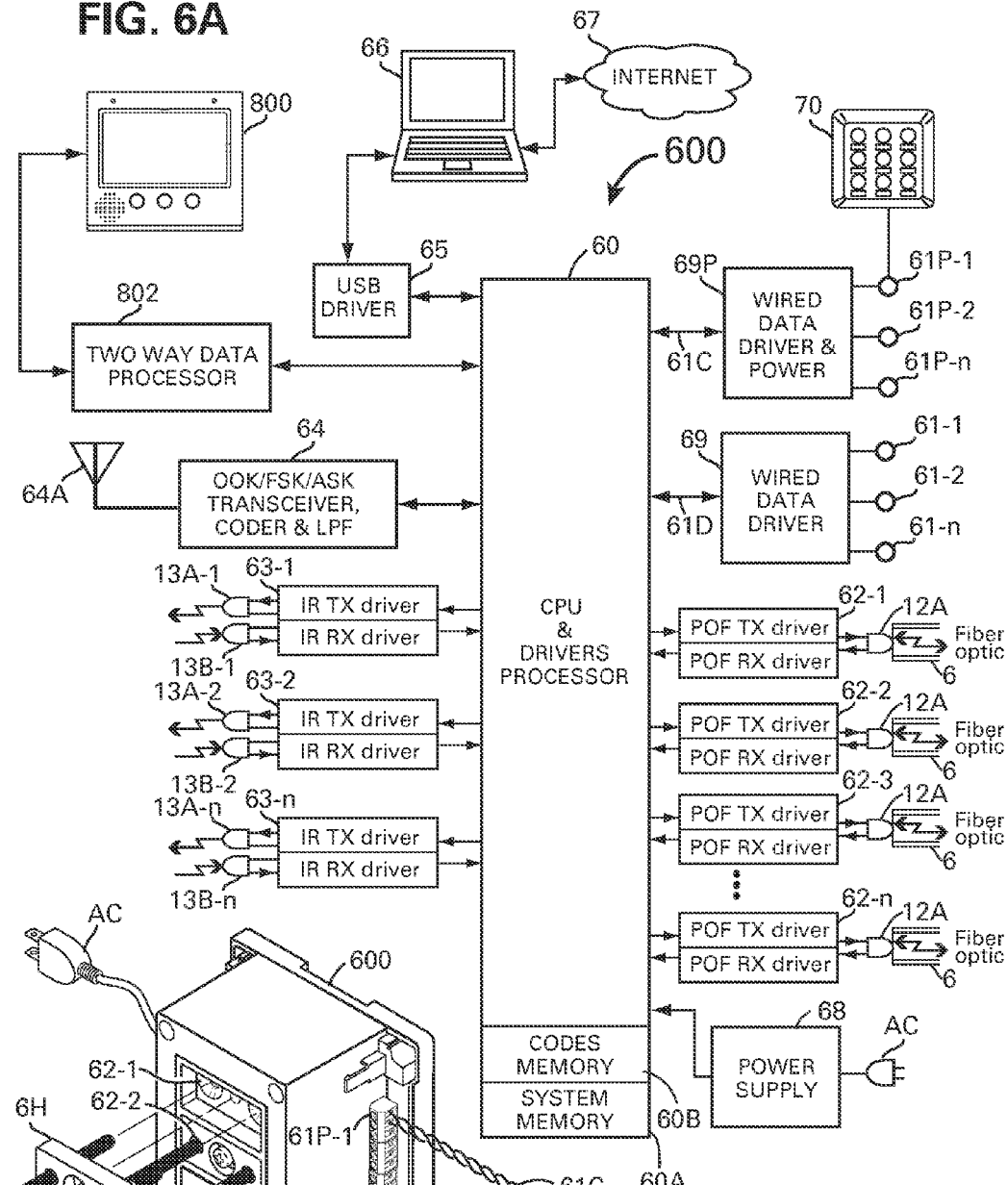
FIGS. 6A and 6B are block diagram and illustration of the premises controller including the accesses for lightguides, the IR drivers and the RF transceiver, the connections to a keypad and through a USB driver to a PC and the Internet of the preferred embodiment.

The memory 21A of the CPU and drivers 21 stores both the relay driver status and the identified switch 1 pole position status that are needed for the CPU to operate the relays without error, such that the individual relays 18, 18-1 to 18-$n$ and 19 will each be operated to contact T1 or T2 terminal, commensurate with the on-commands or off-commands by the keys 25, 25-1~25-$n$, or by a command received from the automation controller shown in FIG. 6A via the optoports, IR or RF commands, via a PC network and the Internet, or as will be explained below, by a double, triple or multi keying of the keys 25 or the switching over of the SPDT switches 5 or the SPDT switches (not shown) through a repeated actions as programmed.

The shown AC devices 10, 10B and 20 of FIGS. 1A, 1B and 2A include the many circuits such as cascading optoports 12-1 and 12-2 for the lightguides 6, IR and RF transceivers 13 and 14, the current sensor 16, the status sensor 15, the setting selectors 24-1~24-$n$, the key 25 in AC devices 10 and 10B and 25-1~25-$n$ in AC device 20. AC device 20 also includes plurality of status sensors 15-1~15-$n$ and indicators 23, 23-1~23-$n$.

It is clear that not all the circuits need to be included, for example, when no cascading lightguides are used only a single optoport 12 is needed, and when only IR or RF commands are used, no optoports are used and only IR 13 or RF 14 transceivers are included in the AC device 10, 10B or 20. It is preferred for the AC device 20 that employs plurality of relays 18 to have a matching plurality number of status sensors 15, keys 25 and indicators 23 for indicating the status of each relay 18 via a transparent portion of the key 25 but different circuits, with or without keys and peripheral components can be used instead.

As disclosed in the referenced patents and applications the settings for the AC devices, such as the room or the zone where the AC device is installed or operated, the appliance identifications and other operation details can be set via a setting selectors 24-1~24-$n$ or via optical downloading through the optoports 12, IR downloading via the IR transceiver 13 or RF downloading via the RF transceiver 14. Such downloading and setting include the programs for switching on-off a group of lights or appliances and all the lights and appliances as explained later.

Accordingly, the inclusion of setting selectors 24-1~24-$n$ and the position sensors 15 or the current sensor 16 into the individual circuits 10, 10B or 20 or into different AC devices can vary according to the intended purposes, and not all the circuits shown are needed or included.

The question of the use of the current sensor 16 versus the status sensor 15 involves the specific requirement and/or the need to report current consumption as measured. The status sensor 15 is cheaper to introduce, and it uses small, low power, low cost signal components. The current sensor cost is higher, the components used are larger in size and the PCB patterns are heavier and thicker. The question of which to use therefore is not a technical issue, but a commercial and/or a compliance issue with the authorities future requirements to report real time power consumption.

Another solution is to use the position sensor 15 by installing into the memory the specified power consumption of the load by the user. This enables to report power consumption as recorded and stored in the memory and not necessarily as measured.

In the case of the AC device 20 of FIG. 2A the shown setup is a preferred solution, wherein the current sensor 16 is providing a total power consumption or current drained values through the plurality of the relays for the reporting purposes, while each individual relay 18 is provided with position sensor for the control of each individual load, group of loads and all the loads connected to the AC device 20.

From the above explanation it is clear that different combinations of circuits and peripheral components can be used for providing many variations to the shown circuits and devices of the present invention, which is to provide simple switching on-off of lights and other appliances to include one specific light or appliance, a group of lights or appliances or all the lights or appliances as set and programmed and operated via the keys 25, 25-1~25-n, the SPDT switches 1, the DPDT switches (not shown), a controller command, and remotely via the automation network or the Internet. The referenced to automation network include all the networks referred to above, optical via lightguides, IR, RF, wired and wired with power feed, or any of them.

The referenced patent application Ser. No. 13/086,610 discloses the many popular and/or standard AC SPDT or DPDT switches as manufactured by different well known brands such as Legrand of France, Gewiss of Italy and Leviton, Pass & Seymour or Cooper of the US. The referenced application also shows the mounting methods of the combined AC switching device and the AC manual SPDT switches into the wall boxes. FIGS. 3A, 3B and 3C show such combined assemblies of AC devices 10 and the SPDT or DPDT switches. Particularly, FIG. 3A shows the front and the rear of two SPDT Gewiss switches 1IT with two AC devices 10IT assemblies wherein IT stands for Italy. The Gewiss 1IT switches are assembled side by side with the AC devices 10IT with each pair is connected by the travelers wires T1 and T2. The shown AC devices are connected in cascaded chain via the lightguides 6-1, 6-2 and 6-3. The AC line L and the neutral line N are also cascading between the switches, highlighting the simplicity of such installation.

The front view of the same switches 1IT and AC devices 10IT shows the lever keys 5 of the switches 1IT and the indicator 23 through a transparent portion of the AC device 10IT front. The front cover of the AC device 10IT can be a fixed cover or a key type cover for operating the key switch 25 shown in FIGS. 1A and 1B. The shown front view includes a decorative wall cover 7IT. The switches 1IT pole terminals are connected to loads 9 shown as fluorescent bulbs.

FIG. 3B shows a rear view of an SPDT switch 1FR manufactured by Legrand of France, physically attached to an AC device 10FR and mounted into a wall frame. The attachment (not shown here, but shown in the referenced application) includes two traveler pins for connecting the traveler lines to the switch 1FR. The AC device 10FR is shown connected to the lightguides 6-1 and 6-2 in a cascaded chain and to AC wires L and N. The switch 1FR pole is shown connected to a load 9, a fluorescent bulb. The AC device 10FR also includes a two color LED illuminator 23 for illuminating the front key 5FR with on-off indication. The shown front view of the switch 1FR and the AC device 10FR assembly is covered by the decorative wall cover 7FR.

FIG. 3C shows two exploded views of the assembling of the AC device 10US, made to fit a popular SPDT switch manufactured by Leviton, Pass & Seymour or Cooper 1US, including the wall box 8US and the wall cover 7US. The traveler T1 and T2 of the AC device 10US are metal links for physical attachment to the T1 and T2 screw terminals on both sides of the switch 1US and the attachment of the metal links hold the AC device 10US and the switch 1US together. The load terminal of the switch 1US is connected to a load 9 shown as fluorescent bulb. The power line L and N and the two cascading lightguides 6-1 and 6-2 are shown connected to the terminals L and N and to the optoports of the AC device 10US.

FIGS. 3A, 3B and 3C illustrate clearly that many of the popular SPDT AC switches, known also as three way switches or four way switches (DPDT) and/or change over switches or straight-cross switches, can be combined with AC devices 10 and 10B and installed into a standard electrical wall box to provide manual and automatic on-off switching of light or appliances, providing the user to operate the electricals the way they are accustomed to and in parallel via the automation network as will be discussed further below.

FIG. 4A shows front views of the AC device 20 in four variations 20-2, 20-4, 20-6 and 20-8 comprising 2, 4, 6 and 8 relays 18 and 2, 4, 6 and 8 keys 25. The keys numbered from 25-1 to 25-8 can be illuminated keys for indicating each light or appliance status by the indicator 23, which can be multi-color indicators for indicating on, off or stand by status and other statuses.

The shown AC devices include IR receiver 13B for receiving commands from an IR remote control or IR repeater 63 shown in FIG. 6A and in the referenced patents and applications. Each of the four shown AC devices 20 include setting selectors 24-1 and 24-2 for setting the room or zone of the premises and for setting the operation mode of the AC devices 20-2~20-8.

FIG. 4B shows an exploded view of the installation of the AC device 20 into a single gang electrical box 8US, that is standard in the US and into a similar size European box 8EU. The AC device 20 is installed into the box using the two shown screws 28 and it is covered by a wall cover 8IT that is similar to the wall cover 7IT of FIG. 3A but is shorter in its length, the 7IT covers four Gewiss switches and the 8IT covers three Gewiss switches, however any wall cover and design can be used and with different size wall boxes.

The shown AC device 20 can be made for 12 or 15 or 20 lights with its keys organized in vertical rows or combination of rows. Electrical wiring devices in general are designed to be modern appealing to the architect and designers and the shown AC device 20 is one design out of limitless possible designs.

FIG. 5 shows an illustrative wiring diagram for connecting the AC device 20-8 to eight SPDT light switches, each connected to the AC device 20-8 via two traveler wires T1 and T2 and each SPDT switch connects through its pole to a load 9 shown as a fluorescent bulb. The shown rear view of the AC device 20-8 includes terminals L an N for the AC power and two optoports 12-1 and 12-2 for connecting in cascaded chain the lightguides 6-1 and 6-2.

The traveler wires T1 and TR are a standard wiring method used in residences and other premises, and the AC device 20 therefore can be installed and connected as a standard AC wiring device which provide a low cost solution to a group or all of the lights of a given residence or other premises. Yet, the AC device 20 provides full automation and the ability to switch on-off a group or all the lights and other appliances via a single key 25 and/or via a single SPDT switch connected to the AC device 20 or to any of the AC devices 10, 10B or 20 as will be explained later.

FIG. 6A is a block diagram of an automation system comprising a controller 800, such as video interphone monitor unit, a shopping terminal, or a dedicated controller that is communicating two way data through a two way processor 802 with the CPU and driver/processor 40 of an automation distributor 600 for distributing or propagating the control commands, confirmations, statuses and current drains or power consumption by the loads, via an RF transceiver 64 and antenna 64A, IR transceivers 63-1~63-n including IR TX 13A-1~13A-n, optoports 62-1~62-n comprising plastic optical fiber transceivers 12A, wired data driver with power feed 69P and/or wired data driver 69, each via multiple terminals 61P-1~61P-n and 61-1~61-n via a twisted pair or other communication cables and via a USB driver 65 for communicating with a PC 66 and via the Internet 67. The PC 66 may include local or dedicated network for communicating the automation data (not shown).

The CPU and Driver processor 60 further include system memory 60A and codes memory or protocols memory 60B. The terminal 61P-1 is shown connected to a keypad 70 that each of its keys can be set via setting selectors similar to the setting selectors 24-1~24-n and/or can be downloaded with a program for setting its keys by the user. The system is powered by the power supply 68.

The referenced patents and applications disclose the use of the video interphone or the shopping terminal 800 as the processing center of the residence or other premises automation, including the reporting via the video interphone or the home automation system or the dedicated system the itemized current drain or power consumption to the appropriate electrical authority and/or similar bodies.

Similar to the shown AC devices in FIGS. 1A and 1B not all the shown circuit in FIG. 6A need to be included in the system control and the automation network. Only specific required circuits such as IR transceiver and repeater 63, RF transceiver 64, optoports 62 and/or wired data drivers 61P and 61 can be used and included in the automation network. The need for USB or other PC interface is also an option, so is the controller 800. The preferred embodiment of the present invention will operate with or without the controller 800 and/or with or without the PC as will be explained below.

Figure 6B:
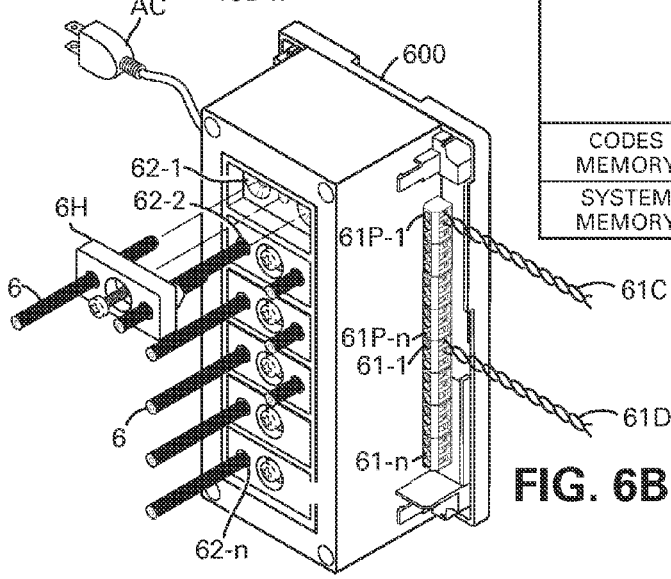

FIG. 6B is an illustration of the automation distributor 600 with the lightguides attachment process to the shown optoports 62-1~62-n and with the terminals 61 and 61P for connecting wired data devices via twisted pairs 61C and 61D. The lightguide 6 is shown being attached to the optoport 62 using a holder 6H.

As explained above the AC devices 10, 10B and 20 include at least one of the sensors 15 and 16 for sensing the current drain and/or the load on-off status, both of which provide the needed data to the CPU 11 or 21 including recording into the memory the last updated status of the given light or appliance. The memory also stores the latest status of the relay driver to provide the needed data for an error free on-off switching. The on-off switching is operated in effect three ways, by the key 25 of the AC devices 10, 10B and 20, by the manual SPDT or DPDT switch and by the automation system. The automation system controls including keypads such as keypad 70 shown in FIG. 6A, a touch screen or keys of the controller 800, an IR or RF remote control, a PC and/or the Internet.

All such automation control commands involve the reversing of the relay 18 or 19 position, from Pos.1 to Pos.2 or from Pos.2 to Pos.1. However, when the load is in off state and the command is to switch the load off, the CPU will not command the relay driver to reverse the relay state. Same will apply when the load state is on and the command is to switch the load on, the CPU will not command the relay driver to reverse the relay state or status.

It is clear from the above that a command propagated to the AC device 10, 10B or 20 to switch on or off the light or an appliance or as termed the load, via the automation network, be it wireless IR or RF, or an optical signal via the lightguide, the AC device will act upon the command only if the appliance status is opposite to the command, i.e., if the appliance is in off state the AC device will act only upon receiving switch on command. Similarly the AC device will act on a switch off command only when the appliance status is on, but the AC device will not act upon switch off command when the load is in off state. Instead the AC device will propagate updated status to the controller 800 and the CPU 60, the keypad 70 and other controlling devices that uses memory (not shown), or will respond with an error command received and no action followed.

The controlling via the key 25 of the AC devices 10, 10B and via any of the keys 25-1~25-n of the AC device 20 is differently acted upon. The illuminated keys are updated instantly when the load status is changed from on to off or off to on.

The preferred embodiment of the present invention uses the indicators 23 for indicating the on-off status of the load, for example by using multicolor LEDs with red indicating off and green indicating on. Further, as the key 25 is operated manually by a user (present on site) the user is able to verify if the light or the appliance is on or off. Accordingly the AC devices 10, 10B and 20 are programmed to switch over or reverse the relay 18 position via its driver regardless if the state is on or off, while updating the recorded status in the memory and simultaneously propagating a change status data or protocol through the automation network and updating the indicator 23 color to commensurate with the new status as verified by the status sensor 15 or the current sensor 16 or both.

The switching on-off by the manual SPDT or DPDT switch as disclosed in the referenced patents and applications does not change or reverses the relay driver status. It is a mechanical change of the pole of switch 1 from its contact with terminal T1 to T2 or vice versa, for connecting or cutting of the power from the load. This does not reverse the relay 18 pole or change the status of the relay driver, retaining the driver status in the AC device memory as is.

The only change in the stored data in the memory is the load on-off status as detected by the current sensor 16 or the status sensor 15, which is routinely propagated to the controller 800, via the automation network and devices, similar to a change in status reporting explained above and the updating of the indicators to commensurate with the new status.

Summarizing the on-off switching method provided by the keys 25 and the SPDT or DPDT AC device that are connected via travelers to SPDT or DPDT electric switches and the responses are:

A. Remotely switching the load via keypads, touch screen, remote control units including remote control by alarm devices such as motion detectors or magnetic contacts, and via a PC, mobile and the Internet.

A1. The on-off commands are compared with the relay driver status and the load status and are acted upon by reversing the relay position only if the received command is opposite to the load status.

B. Operating the AC devices key or keys for reversing the relay position via the relay drivers.

B1. The relay will reverse its position regardless of the on or off status at the time of switching, and propagating the new status via the automation network to all the referred above devices and controllers.

C. Operating the SPDT or DPDT mechanical switches be it push, lever key, toggle or slide switch for connecting or cutting the electric power to the load.

C1. The relay driver and the relay itself will not be reversed or changed. The AC device will detect the load status and will propagate the new detected status through the automation network to all the referred above devices and controllers and will update the indicators of the AC device.

A command to switch on or off a group of, or all of the loads can be generated by any of the referenced controllers including the video interphone or the shopping terminal 800 or a dedicated controller, via a touch screen, the keypad 70, or a remote control unit be it IR or RF or wired including all the control and operating devices disclosed in the referenced patents and applications. The commands propagated via the automation network are to switch on or off a group of loads or all the loads such as lights or air condition or heating or combinations thereof.

The group can be summed up and programmed into the controller to include specific lights and/or appliances in a given room or zone or in a common area by the installer of the system or by the user himself. The user can program the system via the controller touch screen or via the setting selectors that are included, for example, in the keypad 70, similar to the setting selectors 24-1~24-n, or by downloading such "group" program or "all" programs, for example, "all lights" or "all HVAC" (Heating, Ventilation, Air Condition), or such as "close all window shutters", from remote control units via IR, RF or optical signals through a loading lightguide adaptor or via the PC 66 through the USB driver 65 shown in FIG. 6A.

The assigning keys of a keypad or touch icons of a touch screen, or operating "all" command via and an assigned "all" key of a remote control unit is disclosed in the referenced patents and applications. However the assigning of a key to a "group" of loads is not disclosed, not via the controller 800 or the other automation network devices. The disclosure in the referenced patent and application is to switch "all" appliances such as all lights of a given room or zone via an assigned key or icon that is set by setting switches including the setting of a key in a keypad, such as the shown keypad 70. The setting and the programming on-off switching of a group of lights or other appliances through a key of an AC device 10, 10B or 20 and/or via the mechanical SPDT or DPDT switches are novel and are explained further below.

Two solutions explained below include the introduction of the AC device 20 and the plurality of SPDT relays 18 or a plurality of SPDT semiconductor switches similar to the disclosed SPDT semiconductor relays or switches in the referenced patents and applications including the plurality of keys 25-1~25-n and the new, novel introduction, of the sensor circuit 15.

Another solution is the use of the keys 25 of the AC devices 10 and 10b and the keys 25-1~25-n for switching on-off via multi keying actions, wherein the first key action switches on or off the light or appliance that is directly connected to the AC device 10 or 10B. The second action following the first action is a key action to switch on or off a group of lights or appliances and the following third key action switches on or off the all lights or appliances as programmed. Similar multi actions to switch on-off apply to the SPDT or DPDT manual switches, the first switching is the power cut or apply to the directly wired light or appliance, the second action through the mechanical switch operate the CPU 11 to switch a group and the third is to switch all.

The term action as referred to the keys 25 and to a switch lever of a mechanical SPDT or DPDT switch can be push, depress, click, toggle, slide or any other action commensurate with the type of the key or the switch used.

Figure 7A:
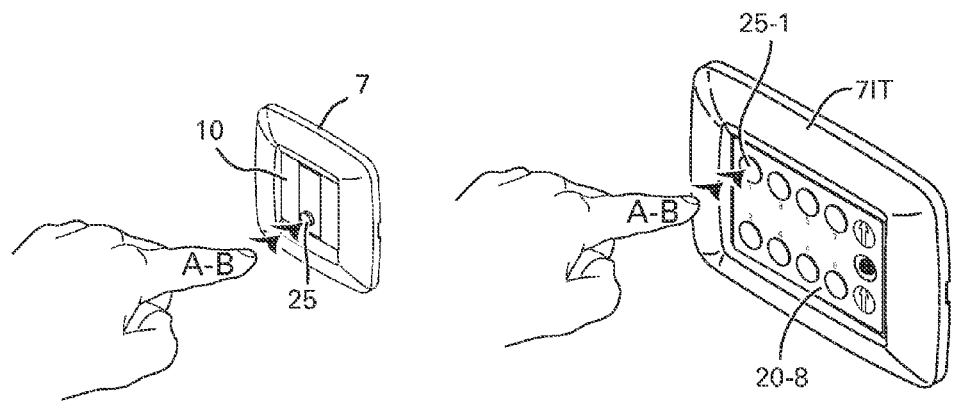
FIGS. 7A, 7B and 7C are illustration of the operation of the key levers of AC switching device and the manual SPDT switches for switching on-off a dedicated, a group and all the lights, or appliances, of the preferred embodiment of the present invention.

Shown in FIG. 7A is an AC device 10 with a push key 25, and an action by the user finger such as dual push A-B. The AC device 10 is connected to an SPDT switch 1 or to a DPDT switch via two travelers T1 and T2 (not shown), but shown in FIGS. 1A and 1B.

With the first push of the key 25 the CPU will respond by reversing the relay 18 or 19 state. If the light was on it will switch off the connected light and vice versa, if the light is off it will switch it on, the second B push, such as "double click" within a given time period between the pushes A and B, for example 500 mSec. or 1.0 Sec. the CPU will generate and propagate a command through the automation network to switch on a group of lights or other appliances as programmed by the controller.

Not shown, but a third push or "triple click" within an equal or similar time period, the CPU will generate and propagate through the automation network a command to switch on all other lights or appliances as programmed. The CPU will instantly respond to the pushing or keying or acting upon the key 25 the second or third time with no reference to the current or position sensing. The individual lights or appliances i.e., the "other" loads of the group or all of the loads, each operated by other individual AC devices, will provide error free switching, by reversing the relay driver or not following the command, in accordance with the individual current or status sensing by each individual AC devices, ensuring that the command to switch its connected load on or off will "reverse" or "stay" to commensurate with the command as received.

Considering the mechanical SPDT switch pole and key lever movements, the programmed time duration, for example 0.5 Sec. or 1.0 Sec., is a duration to enable a mechanical action by the switch lever 5 or other type of switches to complete their movements. As explained above, the AC device will not reverse its relay position when the mechanical movement from contact T1 to contact T2 is completed, but as the current sensor or the status sensor detect a change or a reversal in the status from on to off or off to on, it will trigger the start of the time duration clock. If within this time duration a new status change or reversal is detected it will trigger a command from the CPU to switch off or on a group of loads, yet the next detection within the following time period will trigger a command to switch all on or all off. Both the "group" command and the "all" command are propagated by the AC device 10 through the automation network.

The structure commands for the AC devices and the automation system are disclosed in the referenced pending application Ser. No. 12/963,876. The commands and reporting include a link code for connecting two or more AC devices and other devices of the system. The standard commands include switch on all and switch off all commands, this is simple to introduce because the all commands need not be programmed. The programming to a group of loads to switch on or switch off requires entries into the controller menu, listing the group of loads to be operated by a given AC device or its associated SPDT or DPDT switch. When the AC device transmits a group command to switch on or switch off, the controller follows with corresponding commands to the listed loads in the menu.

Another method is to program each AC device to directly transmit on-off commands to an assigned group of loads including the particulars of each load in the group for direct command and confirmation exchange with each load in the group.

The on switching steps or off switching steps are defined by the first manual switching action, wherein if the light was off and the lever key of the manual SPDT switch was flipped over to switch on the light (i.e., the mechanical contact was changed from T2 to T1 of FIG. 2B) the light will instantly switch on as the electric power circuit is restored.

At this point of time, the current sensor 16 will feed a signal to the CPU that current is flowing and the light is on, or the status sensor output (that until this point was a positive signal identifying off state) will cut its signal to identify an on state. Be it the current sensor 16 or the status sensor 15 or both reversing their status to on state, the status reversing triggers the start of the duration timer, and if during the time duration, the status is changed again (this time to off state) the CPU is programmed to command its relay 18 driver to reverse position and to generate and propagate a group on command, comprising the AC device location and particulars, such that the controller 800 and/or the distributor 600 will propagate on command to the group of lights as programmed.

At this point a re-reversed status triggers the duration timer again, and if another status reversal will take place (the SPDT switch re-keyed for the third time) the AC device 10 or 10B will reverse the relay 18 again and will generate and propagate a switch on command to all, thereby switching on all the lights as programmed. It is clear that when the initial command was to switch on, the next command and the next-next command will both be on commands. When the first switch action is to switch off the directly connected light, the same switching off of a group of lights and all the lights will follow.

However, when the time duration as programmed is passed, the manual switch will operate as a common light switch. Reversing of the SPDT switch will reverse the light status. In this example if the first switching was to switch off the light and two seconds later the user flips the lever key 5 (the time duration is over) the CPU will not respond to the key lever flipping (that changes the status) and the direct connected light will be switched on again by reconnecting the electric power direct, such as light is operated in a common practices, cut or connect the power by a manual light switch.

It is clear from the above that a key 25 of an AC device 10 or 10B can be pushed once, twice or three times within a programmed time duration for switching on the directly connected light or appliance, a group of lights or appliances or combinations thereof as programmed and all the lights or appliances and combinations thereof as programmed.

It is similarly clear that the key 25 can switch off the directly connected light or appliance, a group of lights or appliances and all the lights and appliances and combinations thereof as programmed, in a reverse processes to switch off within the time duration.

It is also clear that same processes will apply to the manual SPDT or DPDT switches. The one difference will be the momentary switch off of the directly connected lights or the appliances during the mechanical movement of the pole between the two contacts T1 and T2 of the mechanical switch, when the command to switch a group or all is processed.

Figure 7B:
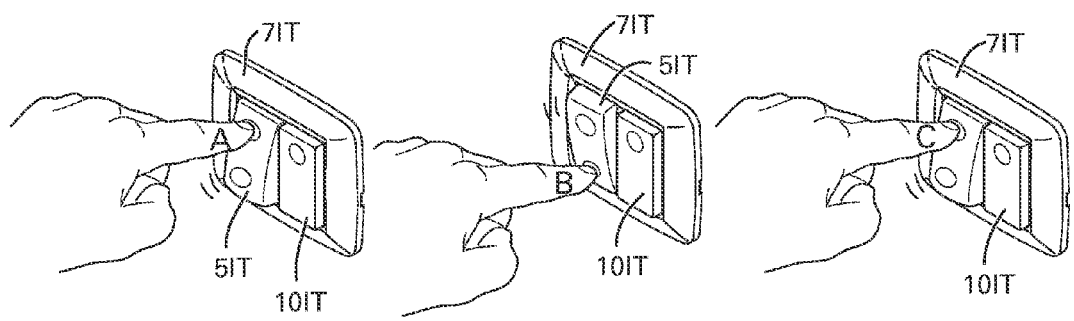
Figure 7C:
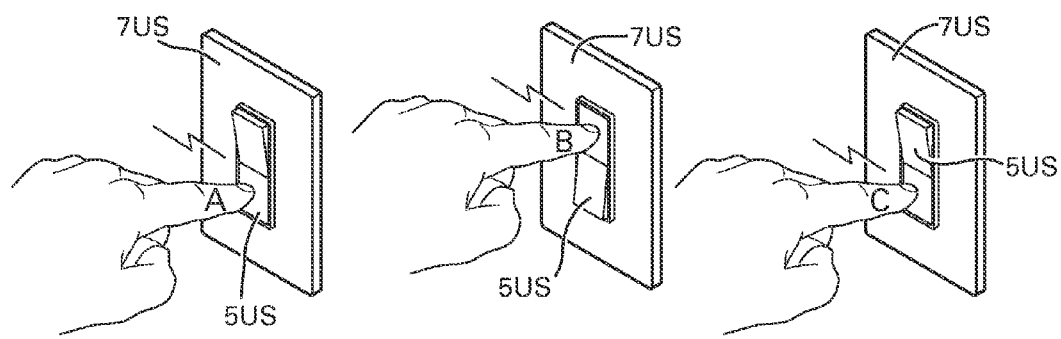

But the fraction of a second flash of light or switch off the light is viewed as a short flashing, confirming the switching command, and will not otherwise cause any disturbance to the process. The process of repeated on actions such as pushing the SPDT or DPDT switch lever are shown in FIG. 7B as A, B and C of the Gewiss switch lever SIT. The illustrative opposite off actions are shown in FIG. 7C where the action is the pushing of the switch lever 7US of the Leviton SPDT or DPDT switches.

Further, the shown front face of the AC device 10IT can be a push key for direct keying once, twice or three times to switch the direct connected light, a group of lights or all the lights as programmed, side by side with the ability to switch on or off the lights via the Gewiss lever key.

The AC device 20 shown in FIG. 5 is a cost effective device to operate a group of lights and is another preferred embodiment of the present invention. The assembling of plurality of relays and keys into one unit is very cost effective because it reduces substantially the parts and enclosures used and it provides for directly connecting a group of lights that need not use AC devices individually, thereby further simplifying the propagated programs for the automation.

A single AC device 20 can be installed in each room or zone of the premises to become the AC device and keypad of the rooms and zones for operating each individual light and a group of the directly connected lights. In a first example, key 1 that switches light 1 on-off is programmed such that the CPU will respond to double keying by key 1 and command the switching on or switching off all the 1~8 group of lights. The third keying will switch on or off all the lights including the lights of other rooms and zones by propagating switch on or switch off "all" command via the automation network.

Similarly in a second example, key 5 that switches light 5 on-off is programmed such that the CPU will respond to the second keying and command the switching on or switching off the 5~8 group of lights, while key 1 is programmed in this second example to be the on-off key for light 1 and for the 1-4 group of lights.

Many other combinations for switching lights and other appliances in "scenarios" combinations, for example lights only combinations via given keys, HVAC by other given keys and window blinds combinations by a third group of keys and providing group combinations via each key, for example by the third click, covering the lights, the HVAC and the blinds in different scenarios by each individual key. The combining of a plurality of relays 18 into one unit, having a control panel like keypad for individual light switching, group of lights and scenario switching, in locations such as entrance, bed room, living room and the kitchen provide the most convenient means for operating the automation.

The switching on or off the individual light, group of light, scenarios of lights with other appliances and/or all lights and appliances is also possible by programming for example one of the group for the scenarios to be "all lights and appliances", or it is similarly possible to add a forth action, i.e. adding one more lever action (forth step) for all lights and appliances. This will enable to click or push the keys for individual on-off switching, a group on-off switching, a scenario on-off switching and all on-off switching.

The reference to keys 25-1~25-n of the AC device 20 is not limited to the keys 25 only. The same way the manual SPDT or DPDT switch is operated in multi steps switching with AC devices 10 or 10B applies to the AC devices 20. Every SPDT switch shown connected to the AC device 20 in FIG. 5 can be operated in the multi steps switching for individual, group, scenario, and all as programmed.

Transforming of the well known AC switches, be it the SPDT switch known as a changeover or three way switch, or the DPDT switch known as four way or Cross-straight switch, into a multi step switch makes the switches convenient for operating the lights and appliances of an automation system in residence, homes, businesses and other buildings, be it in school or public facilities and others. This is in addition to the operating the AC devices via IR or RF remote control and via the automation network of FIG. 6A, making the residence automation simple to operate from anywhere within the residence and from outside the residence and providing simple setting by the user to accommodate the user needs and desire.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for switching a plurality of loads in steps, each load is operated by an electric circuit including one of SPDT and DPDT relay of an AC device and at least one SPDT and DPDT switch, each said AC device further comprising at least one of a current sensor and a status sensor, a CPU, at least one of a memory and a setting selector and at least one transceiver for propagating two way signals;

said two way signals selected from a group comprising optical via an optical cable, IR, RF and combinations thereof for exchanging commands between each AC device associated with said plurality of loads via at least one of a controller network and directly, at least one load selected from said plurality is assigned to be a first load operated by a first switch, said method comprising the steps of:
  a. connecting a pair of traveler wires between said relay and said switch, an AC power to said AC device and to a pole of said relay and said load to a pole of said switch;
  b. installing said AC device and said at least one switch into one of a single electric box together and individually into separated electric boxes;
  c. setting particulars of said each load via at least one of said setting selector and download into said memory of each said AC device including particulars of a selected cluster of said plurality of loads;
  d. keying said first switch for switching said first load on or off;
  e. detecting by one of said current sensor and said status sensor said first load post keying status;
  f. triggering a timer by said detecting with a time limit for rekeying;
  g. rekeying said first switch within said time limit for recalling said cluster switching;
  h. propagating a cluster switching command commensurate with said post keying status to each AC device associated with said cluster of loads via said at least one of controller network and directly; and
  i. applying said cluster switching command to said each AC device associated with said cluster.

2. The method for switching a plurality of loads in steps according to claim 1, wherein the rekeying of said first switch refreshes said timer with an extended time limit for a repeat rekeying, said method comprising the further steps of:
  j. rekeying said first switch within said extended time limit for recalling said plurality switching;
  k. propagating a plurality switching command commensurate with said post keying status to each AC device associated with said plurality of loads via said at least one of controller network and directly; and
  l. applying said plurality switching command to said each AC device associated with said plurality.

3. The method for switching a plurality of loads in steps according to claim 2, wherein said loads are grouped into one of a part of a cluster and more than one cluster, and wherein said cluster is at least two loads.

4. The method for switching a plurality of loads in steps according to claim 3, wherein said assigning first load is selected from a group comprising a single load of said cluster, at least two loads of said cluster, all loads of said cluster and at least one load of said plurality of loads.

5. The method for switching a plurality of loads in steps according to claim 4, wherein said AC device further comprising one of a key and a key with indication for indicating at least one of said load status and said AC device operating status, and wherein said first load operated by said first switch is augmented to operate by said one of first switch and key and said keying, rekeying and repeat rekeying said first switch in steps d., g. and j. of said method are augmented to keying, rekeying and repeat rekeying said one of first switch and key for switching said first load and recalling said cluster switching and said plurality switching respectively.

6. The method for switching a plurality of loads in steps according to claim 5, wherein said AC device is a numerable device for switching a given number of loads each through an individual electric circuit including said relay and said switch, said numerable device further comprising said given number of said relay, said given number of said status sensor for detecting the status of each individual electric circuit and said given number of said key;

said given number is selected from a group comprising a part of said cluster, said cluster, said more than one cluster and combinations thereof, each said individual electric circuit is selectively set via at least one of said setting selector and download for a selective switching of said given number of loads by said keying, rekeying and repeat rekeying steps selected from a group comprising said first load, said cluster, said more than one cluster, another cluster of said more than one cluster, all clusters of said more than one cluster, all said given number of loads, other loads of said plurality and combinations thereof; and said CPU directly operates said given number of relay and said numerable device propagates said switching commands commensurate with said post keying status via said at least one of controller network and directly.

7. The method for switching a plurality of loads in steps according to claim 5, wherein said indication is by a multi color LEDs for indicating statuses selected from a group comprising said keyed key status, said loads status, said cluster status, said plurality status, said AC device operating status, said time delay status and combinations thereof.

8. The method for switching a plurality of loads in steps according to claim 4, wherein said AC device is a numerable device for switching a given number of loads each through an individual electric circuit including said relay and said switch, said numerable device further comprising said given number of said relay, said given number of said status sensor for detecting the status of each individual electric circuit;

said given number is selected from a group comprising a part of said cluster, said cluster, said more than one cluster and combinations thereof and said individual electric circuit is selectively set via at least one of said setting selector and download for a selective switching of said given number of loads by said keying, rekeying and repeat rekeying steps selected from a group comprising said first load, said cluster, said more than one cluster, another cluster of said more than one cluster, all clusters of said more than one cluster, all said given number of loads, other loads of said plurality and combinations thereof; and said CPU directly operates said given number of relays and said numerable device propagates said switching commands commensurate with said post keying status via said at least one of controller network and directly.

9. The method for switching a plurality of loads in steps according to claim 1, wherein said loads are grouped into one of a part of a cluster and more than one cluster, and wherein said cluster is one of at least two loads and all said plurality of loads.

10. The method for switching a plurality of loads in steps according to claim 9, wherein said assigning first load is selected from a group comprising a single load of said cluster, at least two loads of said cluster, all loads of said cluster and at least one load of said plurality of loads.

11. The method for switching a plurality of loads in steps according to claim 10, wherein said AC device further comprising one of a key and a key with indication for indicating at least one of said load status and said AC device operating status, and wherein said first load operated by said first switch is augmented to operate by said one of first switch and key and said keying and rekeying first switch in steps d. and g. of said method are augmented to keying and rekeying said one of first switch and key for switching said first load and recalling said cluster switching respectively.

12. The method for switching a plurality of loads in steps according to claim 11, wherein said indication is by a multi color LEDs for indicating statuses selected from a group comprising said keyed key status, said loads status, said cluster status, said plurality status, said AC device operating status, said time delay status and combinations thereof.

13. The method for switching a plurality of loads in steps according to claim 1, wherein said status sensor comprising two resistors each connected to one of a traveler terminal and jointly form a voltage divider for detecting the continuity status between said load and said live AC.

14. The method for switching a plurality of loads in steps according to claim 1, wherein said propagating of said switching command directly to said each AC device include a direct propagation through a cascading chain of said optical cable cascaded through at least one AC device.

15. The method for switching a plurality of loads in steps according to claim 1, wherein said relay is one of a semiconductor relay and an electromechanical relay and said plurality of relays are selected from a group comprising said semiconductor relays, said electromechanical relays and a combination thereof.

16. A method for switching a numerable loads in steps, each load is operated by an individual electric circuit including one of SPDT and DPDT relay of a numerable device and at least one SPDT and DPDT switch, each said numerable device comprising a given number of said relays, said given number of said status sensors one for each said electric circuit, a CPU, at least one of a memory and a plurality of setting selectors, at least one load selected from said numerable loads is assigned to be a first load operated by a first switch, said method comprising the steps of:
  a. connecting a pair of traveler wires between each of said relays and one said switch, an AC power to said AC device and to each pole of said relays and each said load to a pole of one said switch;
  b. installing said AC device and said given number of said at least one switch for each said electric circuit;
  c. setting particulars of said each load via at least one of said setting selector and download into said memory including particulars of a selected cluster from said numerable loads;
  d. keying said first switch for switching said first load on or off;
  e. detecting by one of said status sensors said first load post keying status;
  f. triggering a timer by said detecting with a time limit for rekeying;
  g. rekeying said first switch within said time limit; and
  h. operating by said CPU the relays associated with said cluster to switch their respective loads commensurate with said post keying status.

17. The method for switching a numerable loads in steps according to claim 16, wherein said rekeying said first switch refreshes said timer with an extended time limit for a repeat rekeying, said method comprising the further steps of:
  i. rekeying said first switch within said extended time limit; and
  j. operating by said CPU said given number of relays to switch their respective loads commensurate with said post keying status.

18. The method for switching a numerable loads in steps according to claim 17, wherein said loads are grouped into one of a part of a cluster and more than one cluster, and wherein said cluster is at least two loads.

19. The method for switching a numerable loads in steps according to claim 18, wherein said assigning first load is selected from a group comprising a single load of said cluster, at least two loads of said cluster, all loads of said cluster and at least one load of said numerable loads.

20. The method for switching a numerable loads in steps according to claim 19, wherein said AC device further comprising one of said given number of keys and said given number of keys with indication with each key of said keys is used for switching each of said numerable loads, said indication provide for indicating at least one of load status including said AC device operating status and wherein said first load operated by said first switch is augmented to operate by said one of first switch and key and said keying, rekeying and repeat rekeying in steps d., g. and i. of said method are augmented to keying, rekeying and repeat rekeying one of said first switch and key for switching said first load and recalling said cluster switching and said numerable switching respectively.

21. The method for switching a numerable loads in steps according to claim 20, wherein said indication is by a multi color LEDs for indicating statuses selected from a group comprising said keyed key status, said loads status, said cluster status, said numerable status, said numerable device operating status, said time delay status and combinations thereof.

22. The method for switching a numerable loads in steps according to claim 16, wherein said loads are grouped into one of a part of a cluster and more than one cluster, and wherein said cluster is one of at least two loads and all said numerable loads.

23. The method for switching a numerable loads in steps according to claim 22, wherein said assigning first load is selected from a group comprising a single load of said cluster, at least two loads of said cluster, all loads of said cluster and at least one load of said numerable loads.

24. The method for switching a numerable loads in steps according to claim 23, wherein said AC device further comprising one of said given number of keys and said given number of keys with indication with each key of said keys is used for switching each of said numerable loads, said indication provide for indicating at least one of said load status including said AC device operating status and wherein said first load operated by said first switch is augmented to operate by said one of first switch and key and said keying and rekeying said first switch in steps d. and g. of said method are augmented to keying and rekeying said one of first switch and key for switching said first load and recalling said cluster switching respectively.

25. The method for switching a numerable loads in steps according to claim 24, wherein said indication is by a multi color LEDs for indicating statuses selected from a group comprising said keyed key status, said loads status, said cluster status, said numerable status, said numerable device operating status, said time delay status and combinations thereof.

26. The method for switching a numerable loads in steps according to claim 16, wherein said numerable device further comprising at least one transceiver for propagating two way signals selected from a group comprising optical via an optical cable, IR, RF and combinations thereof for exchanging commands and responses with at least one of a controller network and directly with other numerable devices associated with said cluster.

27. The method for switching a numerable loads in steps according to claim 26, wherein said numerable device further comprising a current sensor for detecting the current drain through said numerable device for reporting one of current drain and power consumption to said controller network.

28. The method for switching a numerable loads in steps according to claim 26, wherein said given number of current sensors replace said given number of status sensors for providing status and current drain detection for said each electric circuit including its load current drain and power consumption to said controller network.

29. The method for switching a plurality of loads in steps according to claim 26, wherein said exchanging of said commands directly with said other numerable devices include a direct propagation through a cascading chain of said optical cable cascaded through at least one of said numerable device.

30. The method for switching a plurality of loads in steps according to claim 16, wherein said relay is one of a semiconductor relay and an electromechanical relay and said plurality of relays are selected from a group comprising said semiconductor relays, said electromechanical relays and a combination thereof.

31. An apparatus for switching a plurality of loads in steps, each load is operated by an electric circuit including one of SPDT and DPDT relay of an AC device and at least one SPDT and DPDT switch, said electric circuit connects a pair of traveler wires between said relay and said switch, an AC power to said AC device and to a pole of said relay and said load to a pole of said switch, each said AC device further comprising at least one of a current sensor and a status sensor for detecting the status of its load, a CPU, at least one of a setting selector and a memory and at least one transceiver for propagating two way signals;
  said two way signals selected from a group comprising optical via an optical cable, IR, RF and combinations thereof for exchanging commands between each AC device associated with said plurality of loads via at least one of a controller network and directly, at least one load selected from said plurality is assigned to be a first load operated by a first switch;
  said commands comprising particulars of said first loads including particulars of said first load and a cluster selected from said plurality of loads set via at least one of said setting selector and download into said memory, said detecting comprising the detection of a change in said status and a post keying status, wherein said detection of a post keying status resulting from keying said first switch triggers a timer with a time limit for a multi step keying; and
  the rekeying of said first switch within said time limit recalls said cluster switching by transmitting a cluster switching command commensurate with said first load post keying status to each AC device associated with said cluster via said one of controller network and directly for applying said cluster switching command.

32. The apparatus for switching a plurality of loads in steps according to claim 31, wherein said rekeying of said first switch refreshes said timer with an extended time limit for a repeat rekeying said first switch within said extended time limit for propagating a plurality switching command commensurate with said post keying status to each AC device associated with said plurality of loads via said at least one of controller network and directly for applying said plurality switching command.

33. The apparatus for switching a plurality of loads in steps according to claim 32, wherein said loads are grouped into one of a part of a cluster and more than one cluster, and wherein said cluster is at least two loads.

34. The apparatus for switching a plurality of loads in steps according to claim 33, wherein said assigning first load is selected from a group comprising a single load of said cluster, at least two loads of said cluster, all loads of said cluster and at least one load of said plurality of loads.

35. The apparatus for switching a plurality of loads in steps according to claim 34, wherein said AC device further comprising one of a key and a key with indication for indicating at least one of said load status and said AC device operating status, and wherein said first load operated by said first switch is augmented to operate by said one of first switch and key and said keying, rekeying and repeat rekeying said first switch are augmented to keying, rekeying and repeat rekeying said one of first switch and key for switching said first load and recalling said cluster switching and said plurality switching respectively.

36. The apparatus for switching a plurality of loads in steps according to claim 35, wherein said AC device is a numerable device for switching a given number of loads each through an individual electric circuit including said relay and said switch, said numerable device further comprising said given number of said relay, said given number of said status sensor for detecting the status of each individual electric circuit and said given number of said key;
  said given number is selected from a group comprising a part of said cluster, said cluster, said more than one cluster and combinations thereof, each said individual electric circuit is selectively set via at least one of said setting selector and download for a selective switching program of said given number of loads by said keying, rekeying and repeat rekeying selected from a group comprising said first load, said cluster, said more than one cluster, another cluster of said more than one cluster, all clusters of said more than one cluster, all said given number of loads, other loads of said plurality and combinations thereof; and
  said CPU directly operates said given number of relays and said numerable device propagates said switching commands commensurate with said post keying status via said at least one of said controller network and directly to at least one of other AC devices and numerable devices associated with said plurality of loads.

37. The apparatus for switching a plurality of loads in steps according to claim 35, wherein said indication is by a multi color LEDs for indicating statuses selected from a group comprising said keyed key status, said loads status, said cluster status, said plurality status, said AC device operating status, said time delay status and combinations thereof.

38. The apparatus for switching a plurality of loads in steps according to claim 34, wherein said AC device is a numerable device for switching a given number of loads each through an individual electric circuit including said relay and said switch, said numerable device further comprising said given number of said relay, said given number of said status sensor for detecting the status of each said individual electric circuit;
  said given number is selected from a group comprising a part of said cluster, said cluster, said more than one cluster and combinations thereof, each said individual electric circuit is selectively set via at least one of said setting selector and download for a selective switching program of said given number of loads by said keying, rekeying and repeat rekeying selected from a group comprising said first load, said cluster, said more than one cluster, another cluster of said more than one cluster, all clusters of said more than one cluster, all said given number of loads, other loads of said plurality and combinations thereof; and said CPU directly operates said given number of relays and said numerable device propagates said switching commands commensurate with said post keying status via said at least one of controller network and directly to at least one of other AC devices and numerable devices associated with said cluster.

39. The apparatus for switching a plurality of loads in steps according to claim 31, wherein said loads are grouped into one of a part of a cluster and more than one cluster, and wherein said cluster is one of at least two loads and all said plurality of loads.

40. The apparatus for switching a plurality of loads in steps according to claim 39, wherein said assigning first load is selected from a group comprising a single load of said cluster, at least two loads of said cluster, all loads of said cluster and at least one load of said plurality of loads.

41. The apparatus for switching a plurality of loads in steps according to claim 40, wherein said AC device further comprising one of a key and a key with indication for indicating at least one of said load status and said AC device operating status, and wherein said first load operated by said first switch is augmented to operate by said one of first switch and key and said keying and said rekeying said first switch are augmented to keying and rekeying said one of first switch and said key for switching said first load and recalling said cluster switching respectively.

42. The apparatus for switching a plurality of loads in steps according to claim 41, wherein said indication is by a multi color LEDs for indicating statuses selected from a group comprising said keyed key status, said loads status, said cluster status, said plurality status, said AC device operating status, said time delay status and combinations thereof.

43. The apparatus for switching a plurality of loads in steps according to claim 31, wherein said status sensor comprising two resistors each connected to one of a traveler terminal and jointly form a voltage divider for detecting the continuity status between said load and said live AC.

44. The apparatus for switching a plurality of loads in steps according to claim 31, wherein said propagating of said switching command directly to each said AC device include a direct propagation through a cascading chain of said optical cable cascaded through at least one said AC device.

45. The apparatus for switching a plurality of loads in steps according to claim 31, wherein said relay is one of a semiconductor relay and an electromechanical relay and said plurality of relays are selected from a group comprising said semiconductor relays, said electromechanical relays and a combination thereof.

46. An apparatus for switching a numerable loads in steps, each load is operated by an individual electric circuit including one of SPDT and DPDT relay of an AC numerable device and at least one SPDT and DPDT switch, said numerable device is connected to an AC power and each said individual electric circuit connects a pair of traveler wires between said relay and said switch, said AC to a pole of one said relay and said load to a pole of one said switch;

said numerable device comprising a given number of said relays, said given number of status sensor for detecting the status of each said individual electric circuit, a CPU, at least one of a memory and a plurality of setting selectors for at least one of download and setting particulars of each said load including particulars of a cluster selected from said numerable loads, at least one load selected from said numerable loads is assigned to be a first load operated by a first switch; and said detecting by includes a detection of a change in status and a post keying status and said post keying status resulting from keying said first switch triggers a timer with a time limit for a multi step keying, wherein the rekeying said first switch within said time limit triggers said CPU to operate the relays associated with said cluster to switch their respective loads commensurate with said post keying status.

47. The apparatus for switching a numerable loads in steps according to claim 46, wherein said rekeying of said first switch refreshes said timer with an extended time limit and a repeat rekeying said first switch within said extended time limit triggers said CPU to operate all the relays associated with said numerable loads to switch their respective loads commensurate with said post keying status.

48. The apparatus for switching a numerable loads in steps according to claim 47, wherein said loads are grouped into one of a part of a cluster and more than one cluster, and wherein said cluster is one of at least two loads.

49. The apparatus for switching a numerable loads in steps according to claim 48, wherein said assigning first load is selected from a group comprising a single load of said cluster, at least two loads of said cluster, all loads of said cluster and at least one load of said numerable loads.

50. The apparatus for switching a numerable loads in steps according to claim 49, wherein said numerable device further comprising one of said given number of keys and said given number of keys with indication with each key of said keys is used for switching one of said numerable loads, said indication provide for indicating at least one of said load status and said AC device operating status and wherein said keying, rekeying and repeat rekeying said first switch are augmented to keying, rekeying and repeat rekeying said one of first switch and key for switching said first load and operating said cluster switching and said plurality switching respectively.

51. The apparatus for switching a numerable loads in steps according to claim 50, wherein said indication is provided by a multi color LEDs for indicating statuses selected from a group comprising said keyed key status, said loads status, said cluster status, said numerable status, said AC device operating status, said time delay status and combinations thereof.

52. The apparatus for switching a numerable loads in steps according to claim 46, wherein said loads are grouped into one of a part of a cluster and more than one cluster, and wherein said cluster is one of at least two loads and all said numerable loads.

53. The apparatus for switching a numerable loads in steps according to claim 52, wherein said assigning first load is selected from a group comprising a single load of said cluster, at least two loads of said cluster, all loads of said cluster and at least one load of said numerable loads.

54. The apparatus for switching a numerable loads in steps according to claim 53, wherein said numerable device further comprising one of said given number of keys and said given number of keys with indication with each key of said keys is used for switching one of said numerable loads, said indication provide for indicating at least one of said loads status and said AC device operating status and wherein said keying and rekeying said first switch are augmented to keying and rekeying said one of first switch and key for switching said first load and operating said cluster switching respectively.

55. The apparatus for switching a numerable loads in steps according to claim 54, wherein said indication is provided by a multi color LEDs for indicating statuses selected from a group comprising said keyed key status, said loads status, said cluster status, said numerable status, said AC device operating status, said time delay status and combinations thereof.

56. The apparatus for switching a numerable loads in steps according to claim 46, wherein said numerable device further comprising at least one transceiver for propagating two way signals selected from a group comprising optical via an optical cable, IR, RF and combinations thereof for exchanging commands and responses with at least one of a controller network and directly with other numerable devices associated with said cluster.

57. The apparatus for switching a numerable loads in steps according to claim 56, wherein said numerable device further comprising a current sensor for detecting the current drain through said numerable device for reporting one of current drain and power consumption to said controller network.

58. The apparatus for switching a numerable loads in steps according to claim 56, wherein said given number of current sensors replace said given number of status sensors for detecting the status and current drain of said each electric circuit including the reporting of at least one of current drain and power consumption by each load connected to said numerable device to said controller network.

59. The apparatus for switching a plurality of loads in steps according to claim 56, wherein said exchanging of said switching command directly to said other numerable devices associated with said cluster include a direct propagation through a cascading chain of said optical cable extended between at least two of said numerable devices.

60. The apparatus for switching a plurality of loads in steps according to claim 46, wherein said relay is one of a semiconductor relay and an electromechanical relay and said plurality of relays are selected from a group comprising said semiconductor relays, said electromechanical relays and a combination thereof

* * * * *